United States Patent
Shaw et al.

(10) Patent No.: US 10,839,425 B2
(45) Date of Patent: Nov. 17, 2020

(54) COMMERCE SUGGESTIONS

(71) Applicant: AT&T Intellectual Property I, L.P., Atlanta, GA (US)

(72) Inventors: Venson Shaw, Kirkland, WA (US); Sangar Dowlatkhah, Alpharetta, GA (US); Zhi Cui, Sugar Hill, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 670 days.

(21) Appl. No.: 15/048,223

(22) Filed: Feb. 19, 2016

(65) Prior Publication Data

US 2017/0243248 A1 Aug. 24, 2017

(51) Int. Cl.
*G06Q 30/00* (2012.01)
*G06Q 30/02* (2012.01)
*G06F 3/01* (2006.01)
*H04W 4/029* (2018.01)

(52) U.S. Cl.
CPC ......... *G06Q 30/0261* (2013.01); *G06F 3/013* (2013.01); *G06Q 30/0277* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 4,713,651 A | 12/1987 | Morag | |
| 6,320,496 B1 | 11/2001 | Sokoler et al. | |
| 8,838,387 B2 | 9/2014 | Larmo et al. | |
| 8,995,678 B2 | 3/2015 | Demers et al. | |
| 2008/0228577 A1* | 9/2008 | Decre | G06Q 30/02 705/14.53 |
| 2008/0243614 A1* | 10/2008 | Tu | G06Q 30/02 705/14.66 |
| 2011/0148607 A1 | 6/2011 | Zeleny | |
| 2011/0153197 A1 | 6/2011 | Song | |
| 2011/0242316 A1 | 10/2011 | Guerrero | |
| 2012/0239500 A1* | 9/2012 | Monahan | G01S 5/0036 705/14.58 |
| 2013/0054363 A1* | 2/2013 | Sasankan | G06Q 30/0259 705/14.54 |
| 2013/0069862 A1 | 3/2013 | Ur | |

(Continued)

FOREIGN PATENT DOCUMENTS

| | | |
|---|---|---|
| EP | 1035463 | 9/2000 |
| GB | 2522866 | 8/2015 |

(Continued)

OTHER PUBLICATIONS

Szpondowski, Kara L., Ex parte Scott P. Monahan, Jul. 23, 2019, United States Patent and Trademark Office Patent Trial and Appeal Board, Appeal 2018-004518 (Year: 2019).*

(Continued)

*Primary Examiner* — Meredith A Long
(74) *Attorney, Agent, or Firm* — Guntin & Gust, PLC; Ralph Trementozzi

(57) ABSTRACT

Commerce is suggested based on sensory outputs associated with a mobile device. The sensory outputs may represent any parameter, such as physical location or visual gaze. A product in a merchant's inventor may then be recommended, based on the sensory outputs.

20 Claims, 31 Drawing Sheets

(56) References Cited

U.S. PATENT DOCUMENTS

| | | | |
|---|---|---|---|
| 2013/0085345 A1* | 4/2013 | Geisner | G06Q 30/00 600/300 |
| 2013/0203439 A1* | 8/2013 | Lifshitz | H04W 64/00 455/456.2 |
| 2013/0218456 A1 | 8/2013 | Zelek et al. | |
| 2013/0293530 A1* | 11/2013 | Perez | G06K 9/00671 345/418 |
| 2014/0172570 A1* | 6/2014 | y Arcas | H04W 4/21 705/14.58 |
| 2014/0180582 A1 | 6/2014 | Pontarelli et al. | |
| 2014/0266570 A1 | 9/2014 | Sharma et al. | |
| 2014/0266571 A1 | 9/2014 | Sharma et al. | |
| 2014/0365334 A1* | 12/2014 | Hurewitz | G06Q 30/0613 705/26.41 |
| 2015/0066802 A1* | 3/2015 | Goulart | H04W 4/21 705/346 |
| 2015/0070129 A1 | 3/2015 | Moore et al. | |
| 2015/0070386 A1* | 3/2015 | Ferens | G06F 3/011 345/633 |
| 2015/0095161 A1* | 4/2015 | Goel | G06Q 30/0267 705/14.64 |
| 2015/0201181 A1 | 7/2015 | Moore et al. | |
| 2015/0294597 A1 | 10/2015 | Rizzo | |
| 2016/0379225 A1* | 12/2016 | Rider | G06Q 30/0201 382/116 |
| 2018/0040016 A1* | 2/2018 | Vesikivi | G06Q 30/0242 |

FOREIGN PATENT DOCUMENTS

| | | |
|---|---|---|
| WO | WO 2007105937 | 9/2007 |
| WO | WO 2013018558 | 2/2013 |
| WO | WO 2015062579 | 5/2015 |

OTHER PUBLICATIONS

Unkown, "Smart Shoes Guide You With Haptic Feedback and Bluetooth Navigation," Posted by Gregory Han on Aug. 13, 2014 in Main, Style + Fashion, Technology. http://design-milk.com/lechal-smart-shoes/ , 4 pages.

Velázquez, Ramiro, Edwige Pissaloux, and Aimé Lay-Ekuakille. "Tactile-Foot Stimulation Can Assist the Navigation of People with Visual Impairment." *Applied Bionics and Biomechanics* 2015 (2015), 10 pages.

* cited by examiner

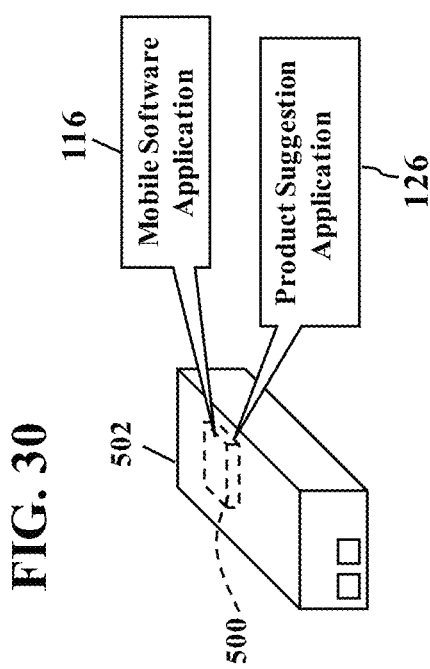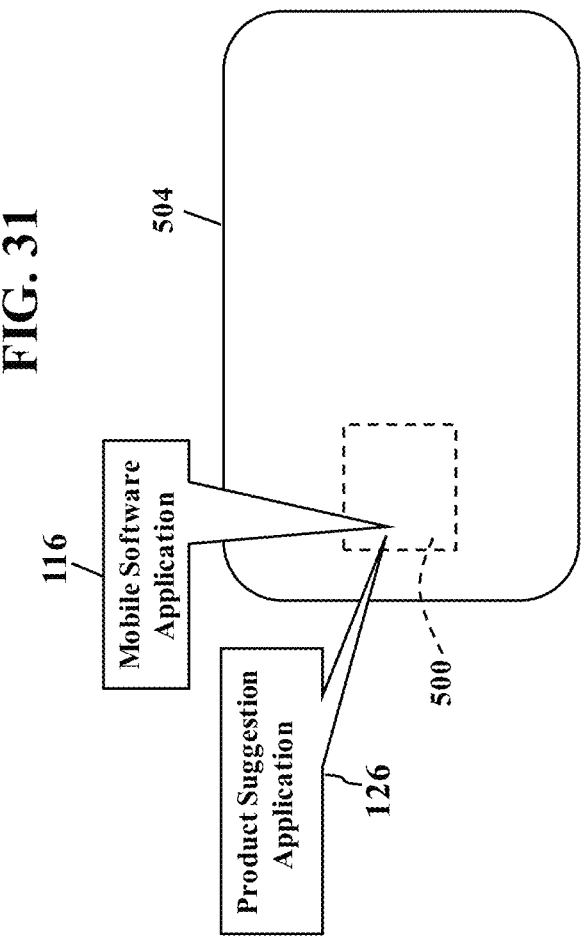

COMMERCE SUGGESTIONS

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Conventional targeting schemes are ill-suited to the mobile environment. Conventional marketing and advertising efforts rely on mailing addresses, ZIP codes, and perhaps even spam electronic messaging. These conventional schemes, though, are known to be ineffective and inapplicable to traditional "bricks and mortar" retailers with physical inventory.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 27-32 depict still more operating environments for additional aspects of the exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
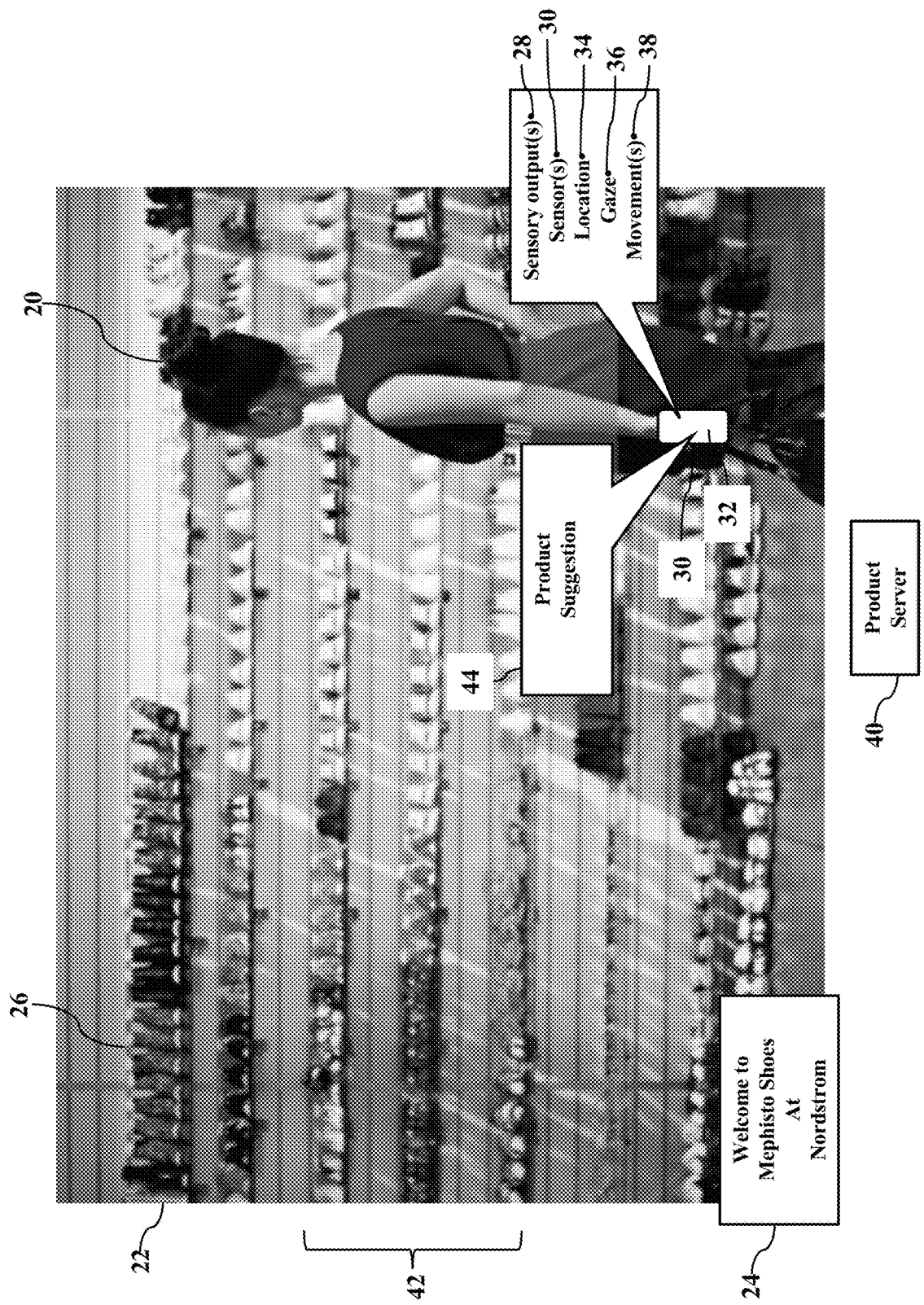
FIGS. 1-7 are simplified illustrations of an environment in which exemplary embodiments may be implemented.

FIGS. 1-7 are simplified illustrations of an environment in which exemplary embodiments may be implemented. FIG. 1 illustrates a human user 20 perusing physical goods 22 offered for purchase by a merchant 24. The physical goods 22 are illustrated as shoes 26, but the physical goods 22 may be any product or service, whether physical or electronic. Regardless, as the user 20 inspects the shoes 26, exemplary embodiments may monitor her movements and infer her interests. That is, exemplary embodiments monitor sensory outputs 28 generated by one or more wearable sensors 30. FIG. 1, for simplicity, illustrates the sensor 30 as the user's smartphone 32, which most readers are assumed familiar. As the user 20 peruses the merchant's physical goods 22, the smartphone 32 acquires information and data that may indicate the user's interest. For example, the sensory outputs 28 may indicate the user's location 34, visual gaze 36, movements 38, and/or many other parameters (which later paragraph will explain). The sensory outputs 28 are conveyed to a backend product server 40. The product server 40 analyzes the sensory outputs 28 to determine inventory 42 that may appeal to the user 20. The product server 40 may thus send a product suggestion 44 to the user 20. FIG. 1, for simplicity, illustrates the product suggestion 44 wirelessly conveying to the user's smartphone 32. The product suggestion 44, for example, visually and/or audibly suggests a pair of the shoes 26 that may appeal to the user 20, based on the sensory outputs 28.

Figure 2:
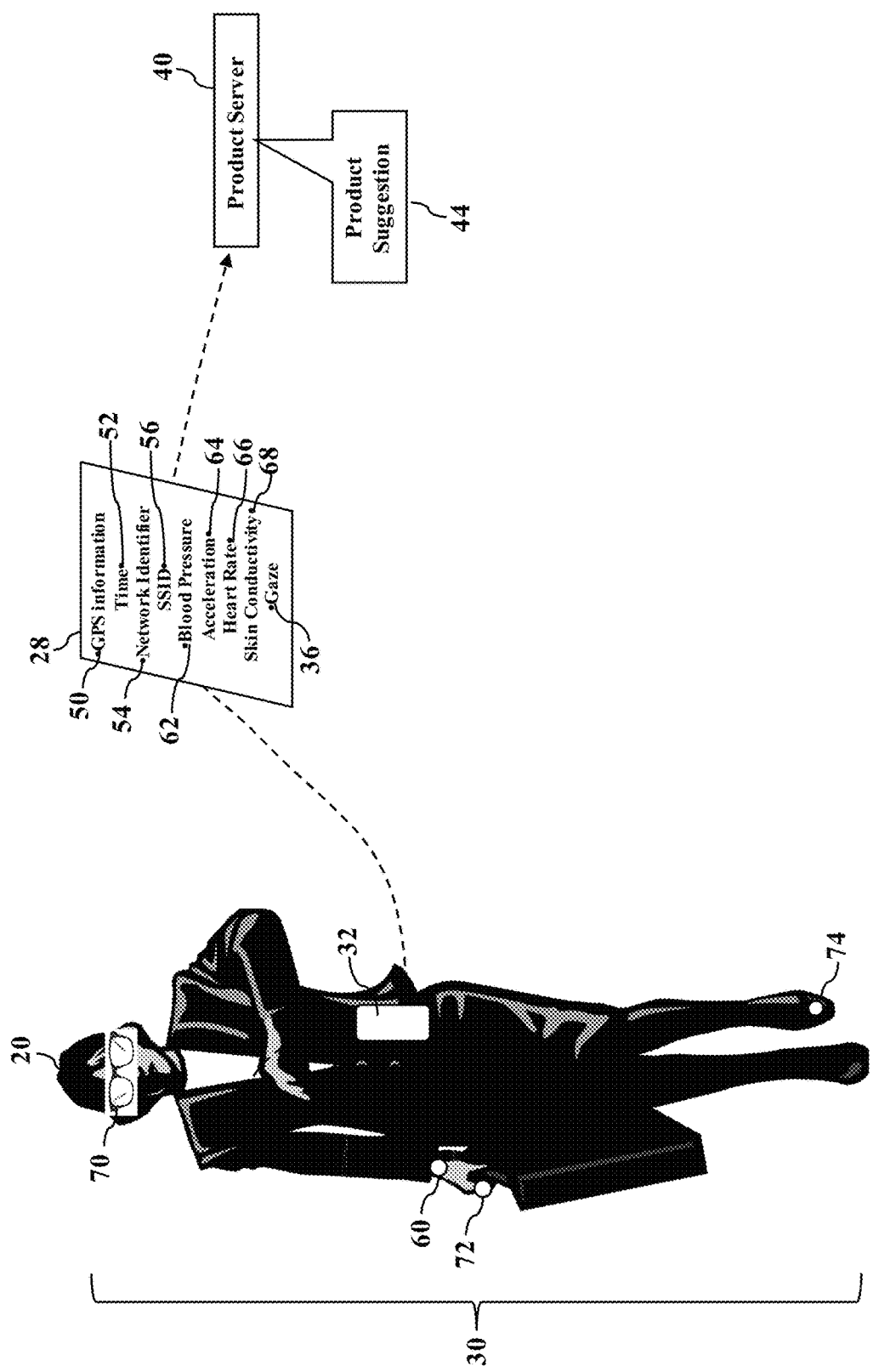

FIG. 2 illustrates diverse sensory reports. The reader likely understands that the user's smartphone 32 may report global positioning system (or "GPS") information 50 (as determined by an internal GPS receiver system). The smartphone 32 may also report a current time 52 and a network identifier 54 (such as a WI-FI® service set identifier or "SSID" 56). These sensory outputs 28 may be wirelessly sent to the product server 40. Moreover, the smartphone 32 may also interface with a smartwatch 60 and send other sensory outputs 28, such as blood pressure 62, acceleration 64, heart rate 66, and skin conductivity 68 (or moisture). The user 20 may even have smart glasses 70 that send or relay its sensory outputs 28 (such as the directional gaze 36). Indeed, any personal asset or article may have smart, processor or transponder capabilities to report a unique identity, location, acceleration, and other sensory outputs 28 (such as a ring 72 and shoe 74 having radio frequency identification or "RFID" tags or other sensors 30). Each sensor 30 may wirelessly send its corresponding sensory output 28 to a network address associated with the product server 40. The product server 40 may thus use the sensory output 28 to generate the product suggestion 44.

Figure 3:
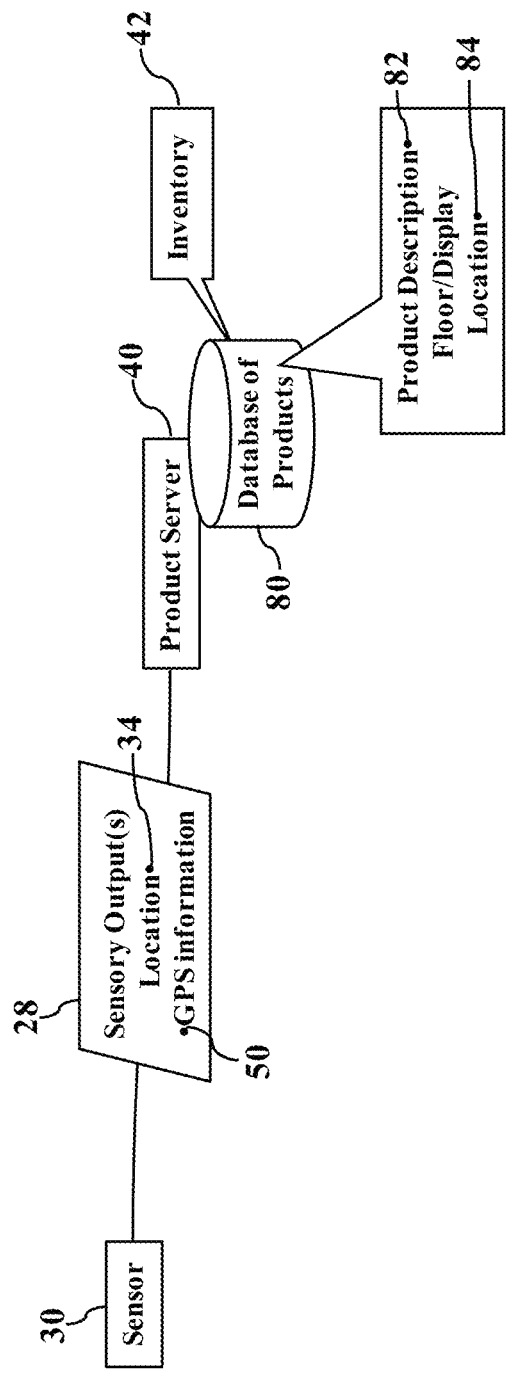

FIG. 3 further illustrates the product server 40. The product server 40 receives the sensory outputs 28 and determines which products or services in the inventory 42 best suit the user's interests and needs. The product server 40, for example, may consult an electronic database 80 of products. The electronic database 80 of products contains descriptions of the products or services in the merchant's inventory 42 (such as the shoes 26 illustrated in FIG. 1). Here, though, exemplary embodiments may relate the sensory outputs 28 to the merchant's inventory 42. As a simple example, the electronic database 80 of products may have entries that electronically associate a product description 82 to its corresponding floor or display location 84. When the sensory outputs 28 reveal the user's location 34 (such as the GPS information 50), the product server 40 may query the electronic database 80 of products for a matching or zonal entry. So, as the human user roams the merchant's store, the product server 40 may use the user's location 34 to suggest goods and services in the user's general vicinity. Exemplary embodiments, in plain words, may promote goods and services according to the user's location 34.

Figure 4:
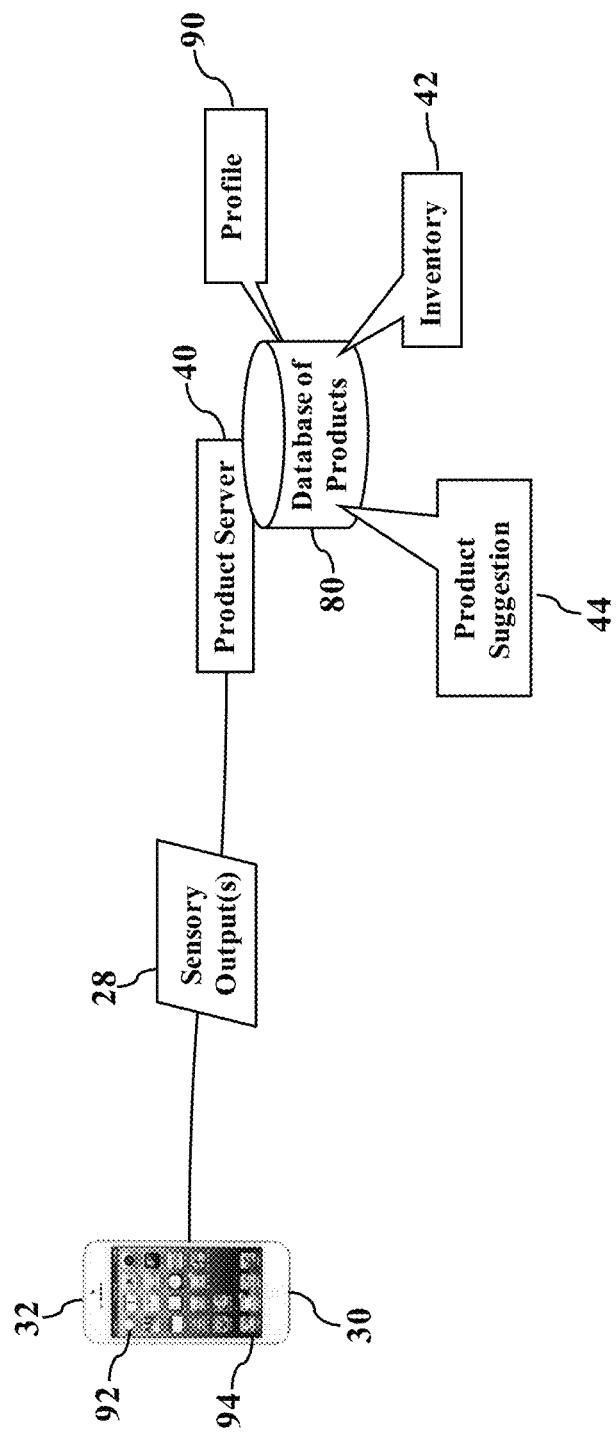

FIG. 4 illustrates profile determination. Here exemplary embodiments may retrieve a profile 90 associated with the user (illustrated as reference numeral 20 in FIG. 1). Suppose, for example, that the product server 40 identifies the user's smartphone 32 (using a unique identifier 92, such as a cellular telephone number or "CTN" 94) and retrieves the corresponding profile 90. The profile 90 may contain demographic information, personal information, content information, and other data that is used for targeting efforts. The product server 40 may thus use the profile 90 in combination with the sensory outputs 28 to further determine the inventory 42 that best appeals to the user's interests and/or needs. The product server 40 may thus hone the product suggestion 44 to the goods and services more likely to be purchased, according to the profile 90.

Figure 5:
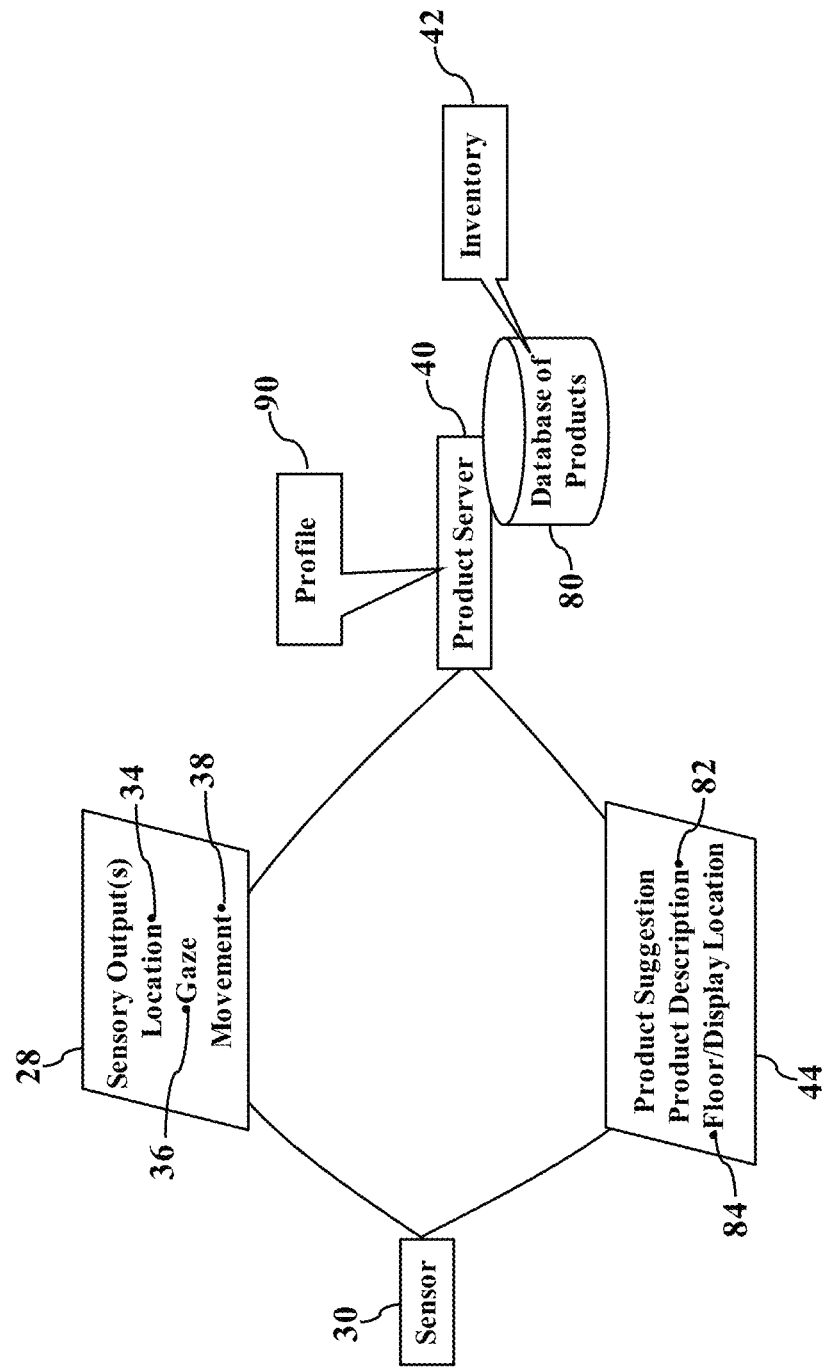

FIG. 5 illustrates confirmation. Once the product suggestion 44 is determined, its effectiveness may be gauged. That is, the product server 40 may continually receive and analyze the subsequent sensory outputs 28 to determine whether the product suggestion 44 is successful. For example, if the user's most recent location 34 approximately matches the suggested product (such as the floor or display location 84 associated with the product description 82), exemplary embodiments may infer that the previous product suggestion 44 at least temporarily captured the user's purchasing interest. Indeed, the subsequent sensory outputs 28 may even indicate that the user's visual gaze 36 turned toward the suggested product (perhaps associated with the product description 82), and her movements 38 may even indicate physical inspection/handling of the suggested product (such as trying on or wearing). Exemplary embodiments may thus infer that the product suggestion 44 successfully appeals to the user 20, based on the sensory outputs 28 generated or received in time after the product suggestion 44.

Figure 6:
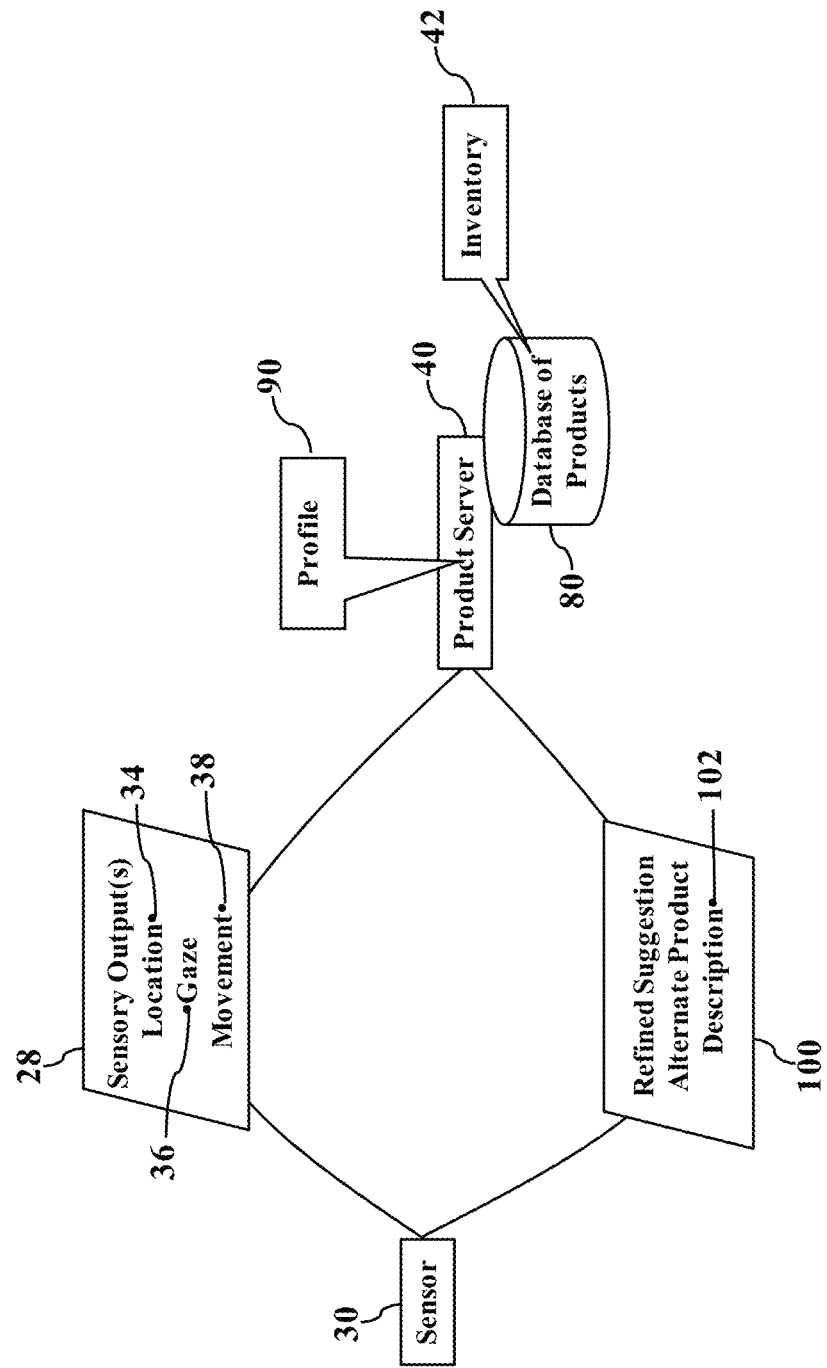

FIG. 6, though, illustrates refinement. After the product server 40 generates and sends the product suggestion 44, the product server 40 may continue receiving the subsequent sensory outputs 28. Here, though, the subsequent sensory outputs 28 may indicate that the user did not successfully respond to the product suggestion 44. For example, if the user's location 34 moves away from the suggested product (such as the floor or display location 84 associated with the product description 82), exemplary embodiments may infer that the product suggestion 44 failed to immediately capture the user's purchasing interest. Moreover, the sensory outputs 28 may indicate that the user's visual gaze 36 aimed or vectored to a different product or even to a different area of the merchant's physical store. Here, then, exemplary embodiments may re-evaluate the inventory 42 and send a refined suggestion 100 to the user's smartphone 32. The refined suggestion 100, for example, presents an alternate product description 102 (such as a different pair of shoes) that may better appeal to the user 20, perhaps according to the profile 90. The product server 40 may then again analyze the subsequent sensory outputs 28 as feedback to determine whether the refined suggestion 100 is successful.

Exemplary embodiments may thus recommend commerce opportunities. Exemplary embodiments may monitor the sensory outputs 28, suggest products, and make inferences of product interest. Exemplary embodiments may match the merchant's inventory 42 to the profile 90 associated with a passing/entering shopper. So, whether the merchant 24 is a mall retailer, big box retailer, kiosk, or street vendor, exemplary embodiments promote the merchant's products and services to the customers physically present. Exemplary embodiments, in other words, generate commerce opportunities.

Figure 7:
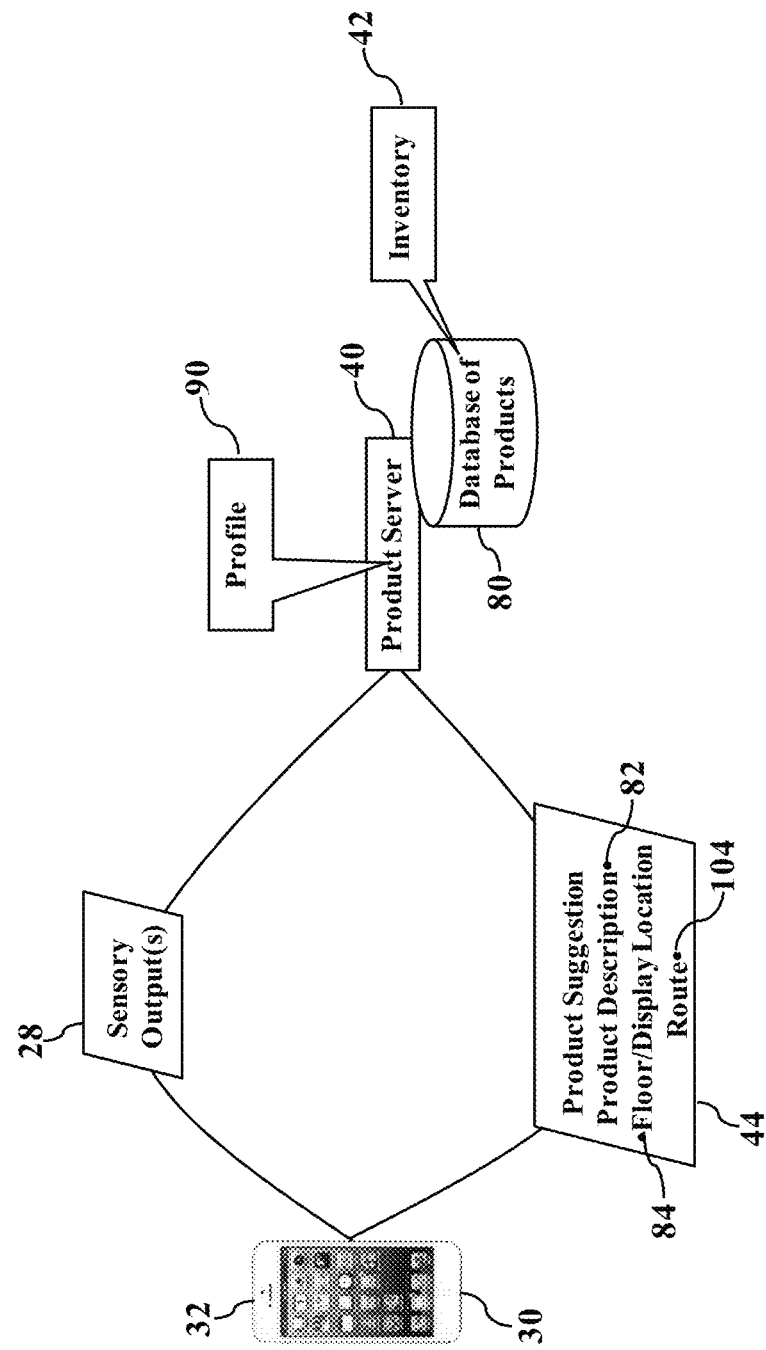

FIG. 7 illustrates directional routing. Here exemplary embodiments may guide the potential customer (such as the user 20 illustrated in FIG. 1) to an appealing product or service. The product server 40 analyzes the sensory outputs 28 in real or near real time and determines the inventory 42 that may appeal to the user 20. Exemplary embodiments may thus again generate and send the product suggestion 44 (perhaps to the user's smartphone 32) as an alluring commerce transaction. Here, though, exemplary embodiments may also generate a route 104 to the suggested product (e.g., the floor or display location 84 associated with the product description 82). The user's smartphone 34, in other words, may be guided through the mall or store to the physical location of the suggested product. Exemplary embodiments may even generate navigational instructions (e.g., "turn left") from the user's current location 34 to a final destination representing the floor/display location 84 associated with the suggested product. The customer may thus be visually and/or audibly mapped to the suggested product.

Exemplary embodiments thus recommend commerce in response to user behavior. Exemplary embodiments analyze the sensory outputs 28 and determine the inventory 42 that appeals to the user 20. The sensory outputs 28 may be used to infer the user's real time behaviors, head turns, hand waives, body language, facial expressions, and other indications of interest. Recent or even sudden changes in the user's behavior may be detected to infer product interest. Indeed, patterns in movements (such as stop and go movements, back-and-forth turns, and circular movements) may reveal interest or even disinterest. These user behaviors may be correlated to local events or retailers and/or to products and services. Exemplary embodiments, in other words, reveal the user's immediate, personal, and "at the moment" attention and needs. These inferences may thus be correlated to the local merchant 24 and to the inventory 42.

Figure 8:
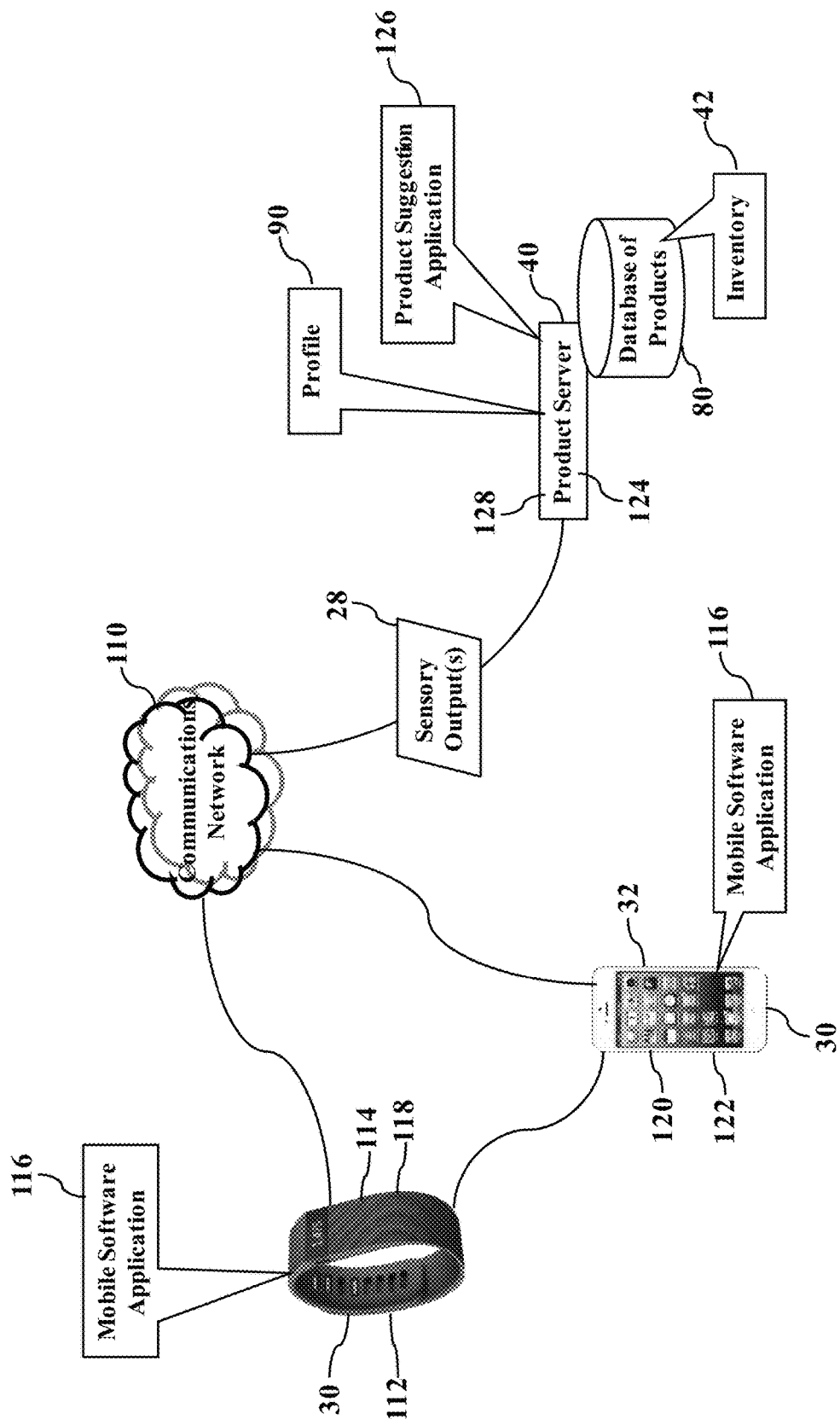
FIGS. 8-9 are more detailed illustrations of the operating environment, according to exemplary embodiments.
Figure 9:
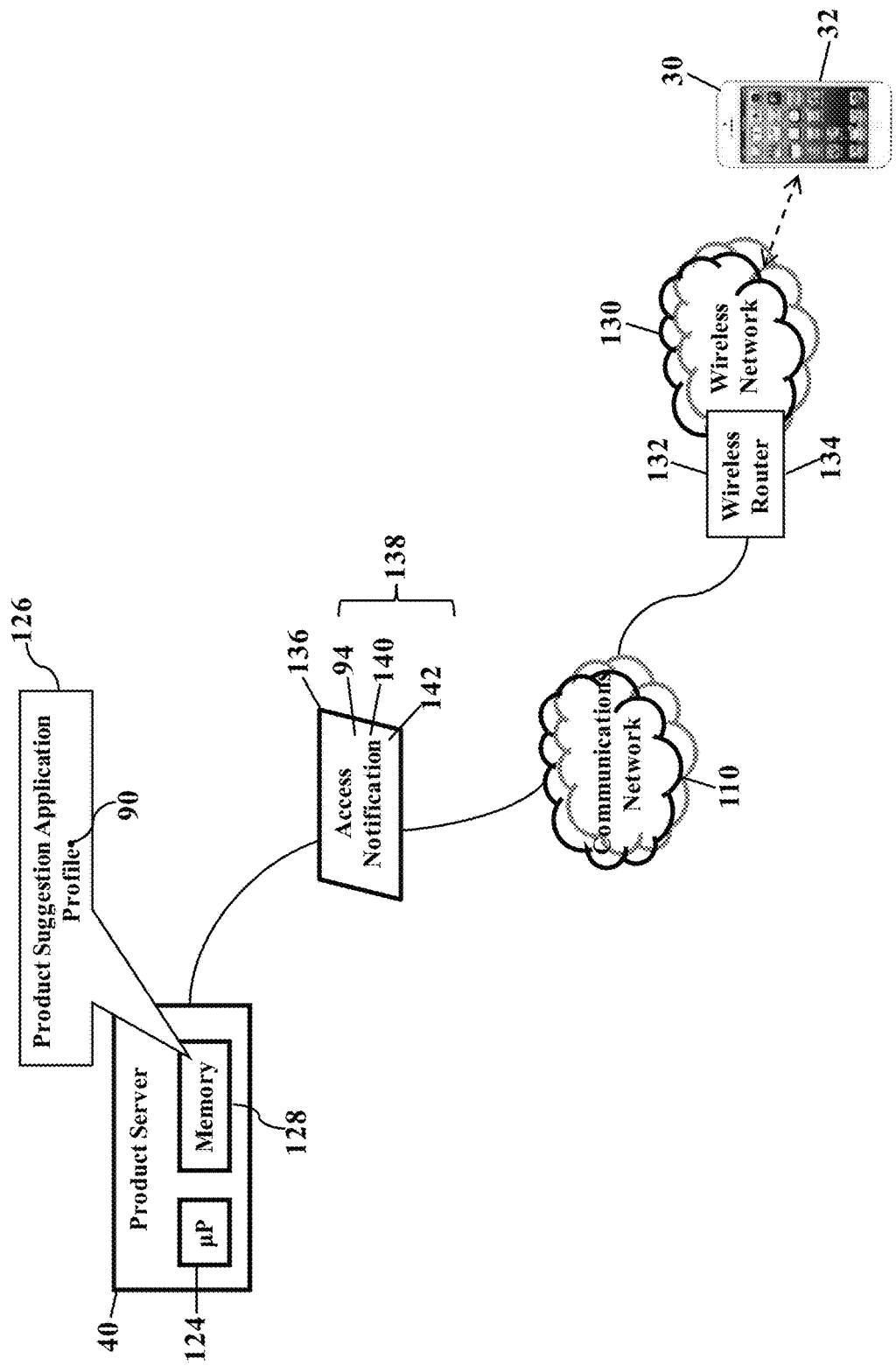

FIGS. 8-9 are more detailed illustrations of the operating environment, according to exemplary embodiments. FIG. 8 illustrates the sensor 30 communicating with the product server 40 via a communications network 110. FIG. 8 illustrates the sensor 30 as a wireless fitness monitor 112, which again the reader may recognize. The fitness monitor 112 may generate and send its sensory output 28 via the communications network 110 to the Internet protocol address associated with the product server 40. However, the fitness monitor 112 may send its sensory output 28 to the smartphone 32 for relay or upload via the communications network 110 to the Internet protocol address associated with the product server 40. The smartphone 32 may also send the sensory output 28 via the communications network 110 to the product server 40. The fitness monitor 112 may thus have a processor 114 that executes a mobile software application 116 stored in memory device 118. The smartphone 32 likewise may have a processor 120 that executes the mobile software application 116 stored in memory device 122. The product server 40 has a processor 124 that executes a product suggestion application 126 stored in a memory device 128. The mobile software application 116 and the product suggestion application 126 may thus cooperate (perhaps in a client-server relationship) to recommend the merchant's inventory 42 based on the sensory outputs 28 and/or the profile 90.

FIG. 9 illustrates presence detection. When the sensor 30 (such as the smartphone 32) enters any area, the sensor 30 may establish wireless communication with a wireless network 130 serving the area. The smartphone 32, for example, may request access or permission to a wireless local area network (such as WI-FI®), wide area cellular network, or any other network. The wireless network 130 may only recognize, or transmit/receive, using a particular frequency or band. The smartphone 32 may thus instruct its transceiver (not shown for simplicity) to wirelessly request access permission using the electromagnetic frequency band, channel, or standard required by the wireless network 130.

The product server 40 may be notified. When the wireless network 130 detects the sensor 30 (such as the smartphone 32), exemplary embodiments may inform the product server 40. That is, the sensor 30 may send an access request to an access device 132 serving the wireless network 130. FIG. 9 illustrates the access device 132 as a wireless router 134, which commonly serves many residential and business WI-FI® networks. However, the access device 132 may be any network interface to an access network, such as a gateway, cable modem, or DSL modem. Regardless, the sensor 30 broadcasts an electronic request that seeks access permission to the wireless network 130. When the access device 132 receives the access request, the access device 132 may send a packetized access notification 136 into the communications network 110 for routing and delivery to the network address associated with the product server 40. The wireless router 134, for example, may store or execute code or programming that forces or commands the access notification 136 when any device attempts to access the wireless network 130. The access notification 136 may thus alert the product server 40 to the radio frequency presence of the sensor 30. The access notification 136 may further include information that uniquely identifies the sensor 30, such as data representing a cellular identifier 138. While any alphanumeric combination may uniquely identify the sensor 30, FIG. 9 illustrates the cellular telephone number (or "CTN") 94, an International Mobile Subscriber Identity (or "IMSI") 140, or Mobile Station International Subscriber Directory Number ("MSISDN") 142. Whenever the sensor 30 sends messages or information, the sensor 30 may include or self-report its CTN 94, IMSI 140, and/or MSISDN 142.

The product server 40 may recognize the sensor 30. The product server 40 may be informed of the wireless network presence associated with the sensor 30 (such as the smartphone 32). Indeed, whenever the sensor 30 sends its sensory output 28, packet headers and/or payload may also include or represent the cellular identifier 138. The product suggestion application 126 instructs the processor 124 to perform operations, such as receiving and processing information received from a network interface to the communications network 110. The information may be received as packets of data according to a packet protocol (such as any of the Internet Protocols). The packets of data contain bits or bytes of data describing the contents, or payload, of a message. A header of each packet of data may contain routing information identifying an origination address and/or a destination address. The product suggestion application 126, for example, may instruct the processor 124 to inspect the packetized access notification 136 for the cellular identifier 138.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 10:
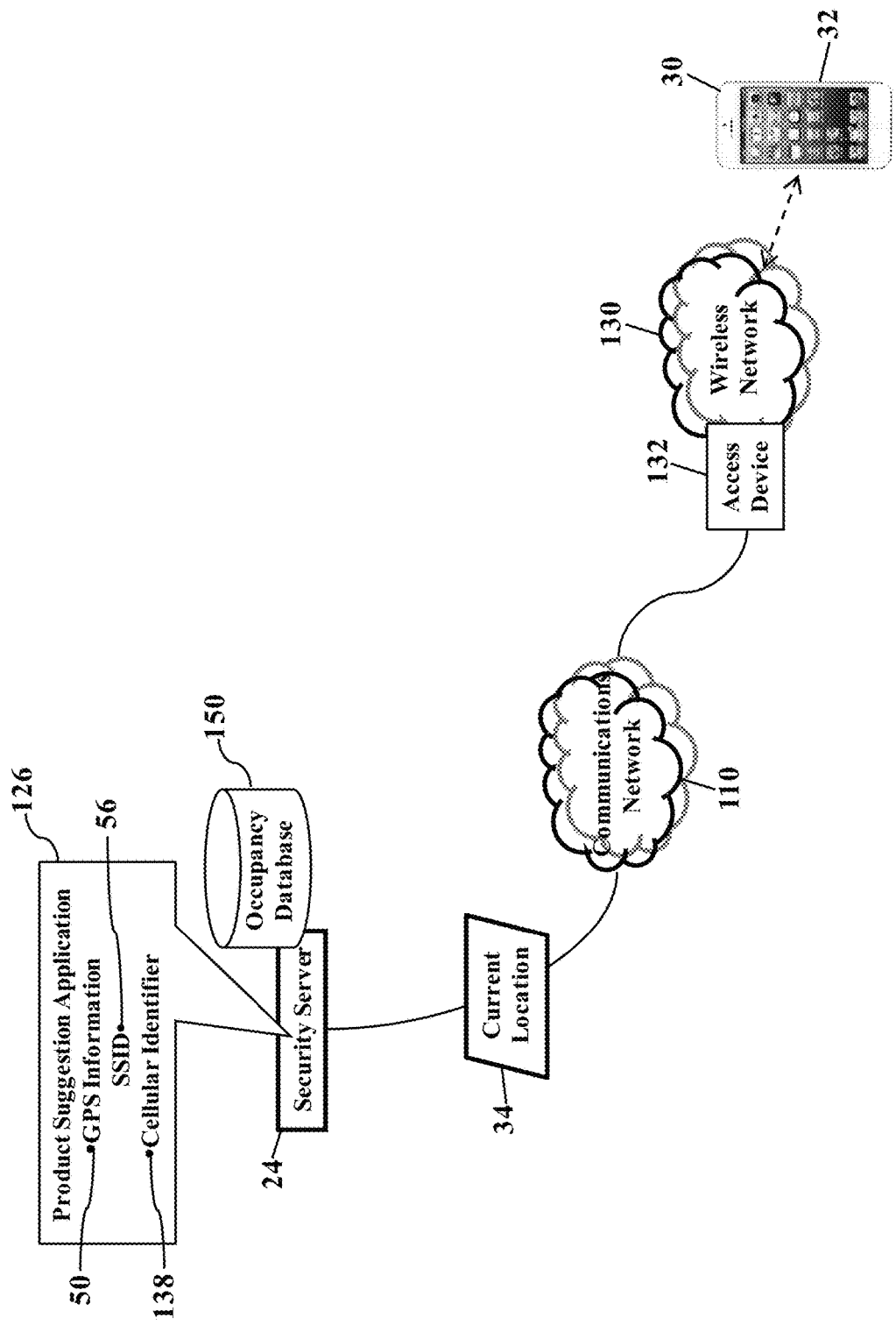
FIGS. 10-12 illustrate locational tracking, according to exemplary embodiments.
Figure 11:
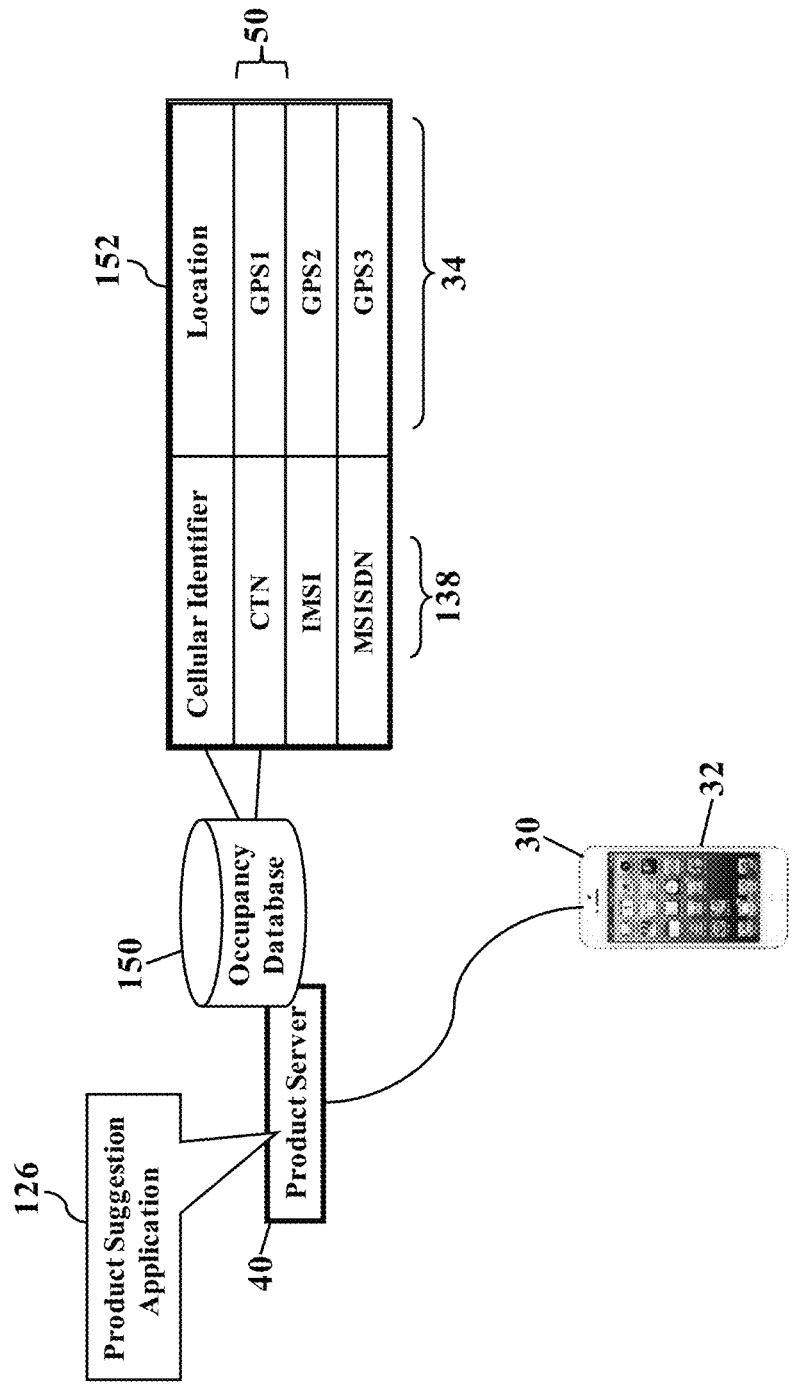
Figure 12:
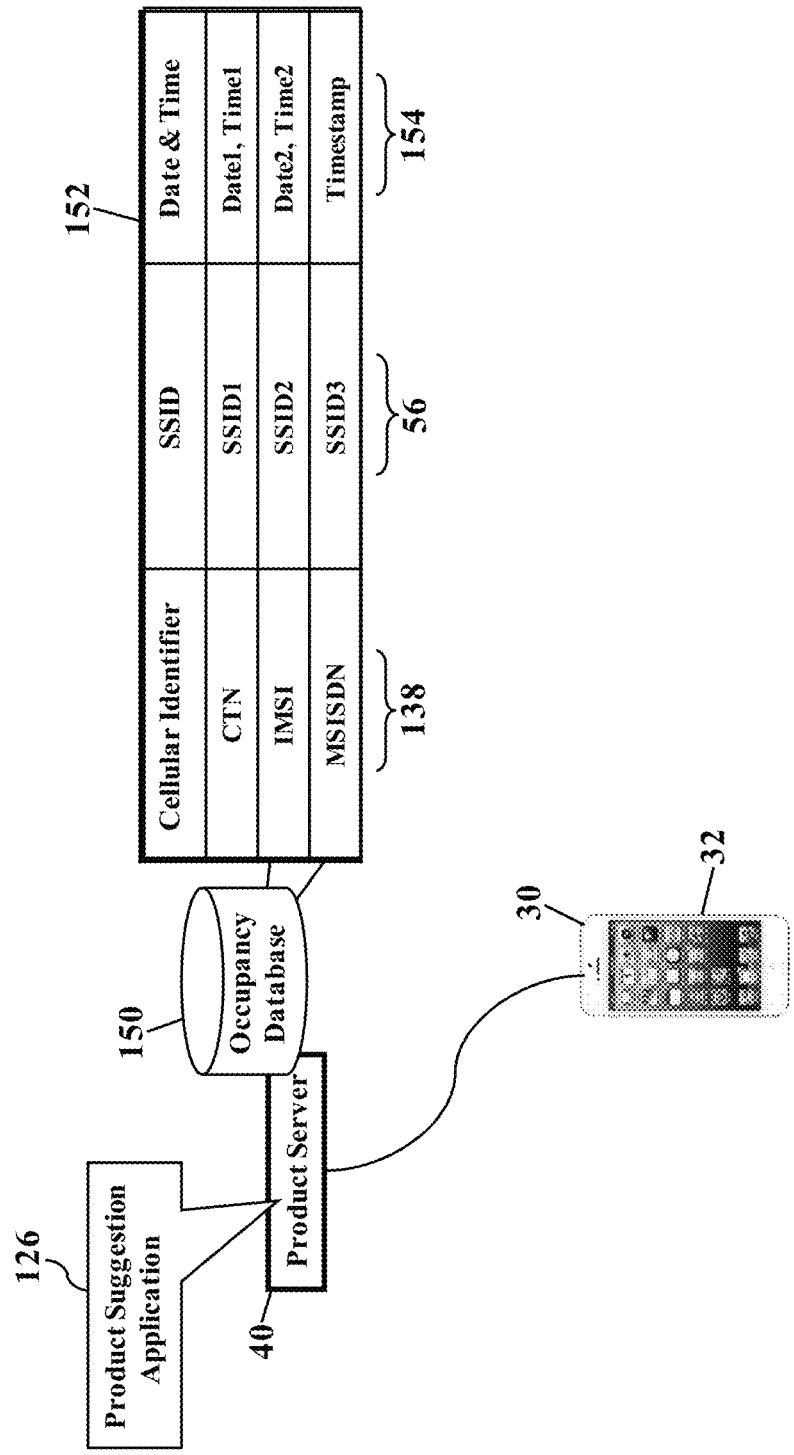

FIGS. 10-12 illustrate locational tracking, according to exemplary embodiments. Here exemplary embodiments may monitor a wireless presence of the sensor 30 (again illustrated as the smartphone 32 for simplicity). When the smartphone 32 enters any area of the merchant's facility, the smartphone 32 may attempt to access the wireless network 130 (e.g., WI-FT® or cellular) serving the floor, room, or area. Once the wireless network 130 detects the radio presence of the smartphone 32, exemplary embodiments may determine its current location 34. The smartphone 32, for example, may broadcast its global positioning system (or "GPS") information 50, which may be logged in an electronic occupancy database 150. The user's location 34 may additionally or alternatively be represented using the service set identifier (or "SSID") 56 that uniquely identifies the wireless local area network (e.g., WI-FI®) 130 serving the corresponding area. As the user 20 roams the merchant's facility, exemplary embodiments may thus monitor and log the user's location 34 according to time, based on reports sent from the smartphone 32. The occupancy database 26 may thus log entries having electronic database associations between the cellular identifier 138, the global positioning system information 50, and/or the SSID 56. Exemplary embodiments thus monitor the locations of any wireless devices. Indeed, badges, watches, and other wearable smart devices may be wirelessly tracked throughout the merchant's facility. The occupancy database 150 thus contains occupancy information describing the occupants inside the merchant's facility, as determined from their various mobile or smart devices.

FIG. 11 further illustrates the occupancy database 150. The occupancy database 150 logs the locations 34 reported by the sensors 30 (such as the smartphone 32). FIG. 11 illustrates the occupancy database 150 as a table 152 that electronically maps, relates, or associates different current locations 34 to a unique identifier (such as the cellular identifier 138 associated with the smartphone 32). The sensor 30, though, may be additionally or alternatively uniquely identified by a network address, a manufacturer's serial number, or any other alphanumeric combination. The occupancy database 150 is illustrated as being locally stored in the product server 40, but some or all of the electronic database entries may be remotely maintained at some other server or location in the communications network (illustrated as reference numeral 110 in FIG. 8). Although FIG. 11 only illustrates a few entries, in practice the occupancy database 150 may contain many entries that richly detail the movements of the sensor 30. Moreover, the occupancy database 150 may track the movements of many wireless devices. As shoppers, visitors, and employees come and go, the occupancy database 150 may monitor the locations 34 reported by many different wireless devices. In practice, then, the occupancy database 150 may contain many entries that richly detail the movements of hundreds or thousands of different mobile devices.

FIG. 12 illustrates network tracking. Here exemplary embodiments may use network recognition to track the current location 34 of the sensors 30 (such as the occupant's smartphone 32). As the reader may understand, GPS signals are sometimes not received in indoor environments. Moreover, other users may disable GPS location services for privacy concerns. Whatever the reason, GPS signals may not be available or receivable. Exemplary embodiments, then, may additionally or alternatively track the current location 34 using the network identifier 54 (such as the WI-FI® service set identifier or "SSID" 56). As the user roams and carries the smartphone 32, the smartphone 52 may wirelessly encounter different wireless local area networks (e.g., WI-FI®) serving the different floors, hallways, and/or rooms within a building or area. The smartphone 32 may also detect other identifiers of other networks (such as different cellular network cells). Regardless, the occupancy database 150 may additionally or alternatively have entries that electronically associate the cellular identifier 138 to the SSID 56 and to a timestamp 154 that marks a date/time of access to the wireless network 130.

Exemplary embodiments thus present an elegant solution. In today's mobile environment, people may be uniquely identified by their mobile devices (such as the smartphone 32). Employees, tenants, and visitors may thus be personally identified merely by carrying or wearing their mobile devices. The occupancy database 150 thus contains entries that uniquely identify the wireless devices associated with the occupants. As any wireless device requests network access, the occupancy database 150 logs the corresponding current location 34. At any time, then, the occupancy database 150 provides a real time view of the current locations 34 of the occupants, as determined by tracking their wireless devices. Exemplary embodiments may also infer actions based on the entries in the occupancy database 150. As exemplary embodiments log different current locations 34 for the smartphone 32, patterns and movements may be tracked and compared to predetermined scenarios. Each different scenario may be associated with a predetermined action. For instance, if the current locations 34 remain stagnant over time, perhaps coupled with the acceleration 64 indicating a physical slip or fall, exemplary embodiments may trigger an emergency alarm and contact a health care provider and 911.

Figure 13:
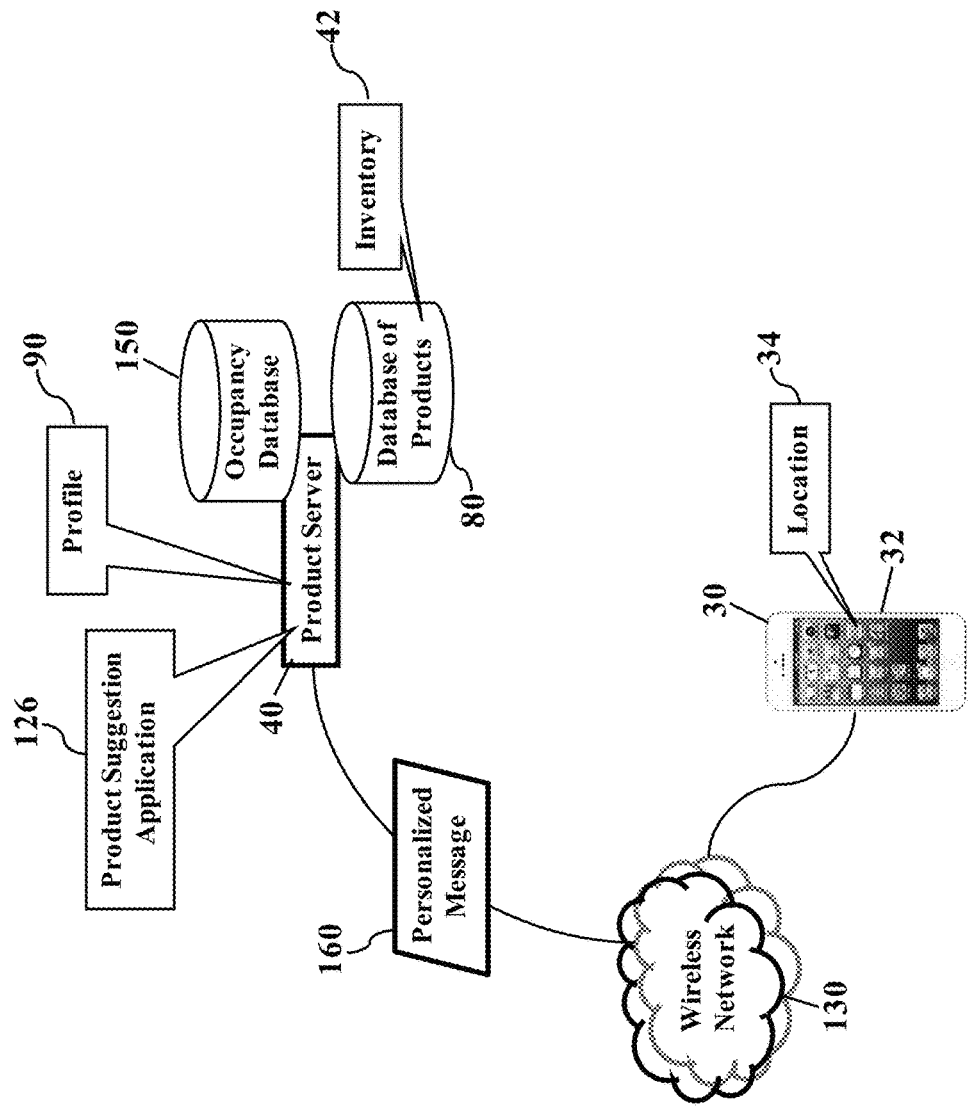
FIGS. 13-14 illustrate personalized messages, according to exemplary embodiments.
Figure 14:
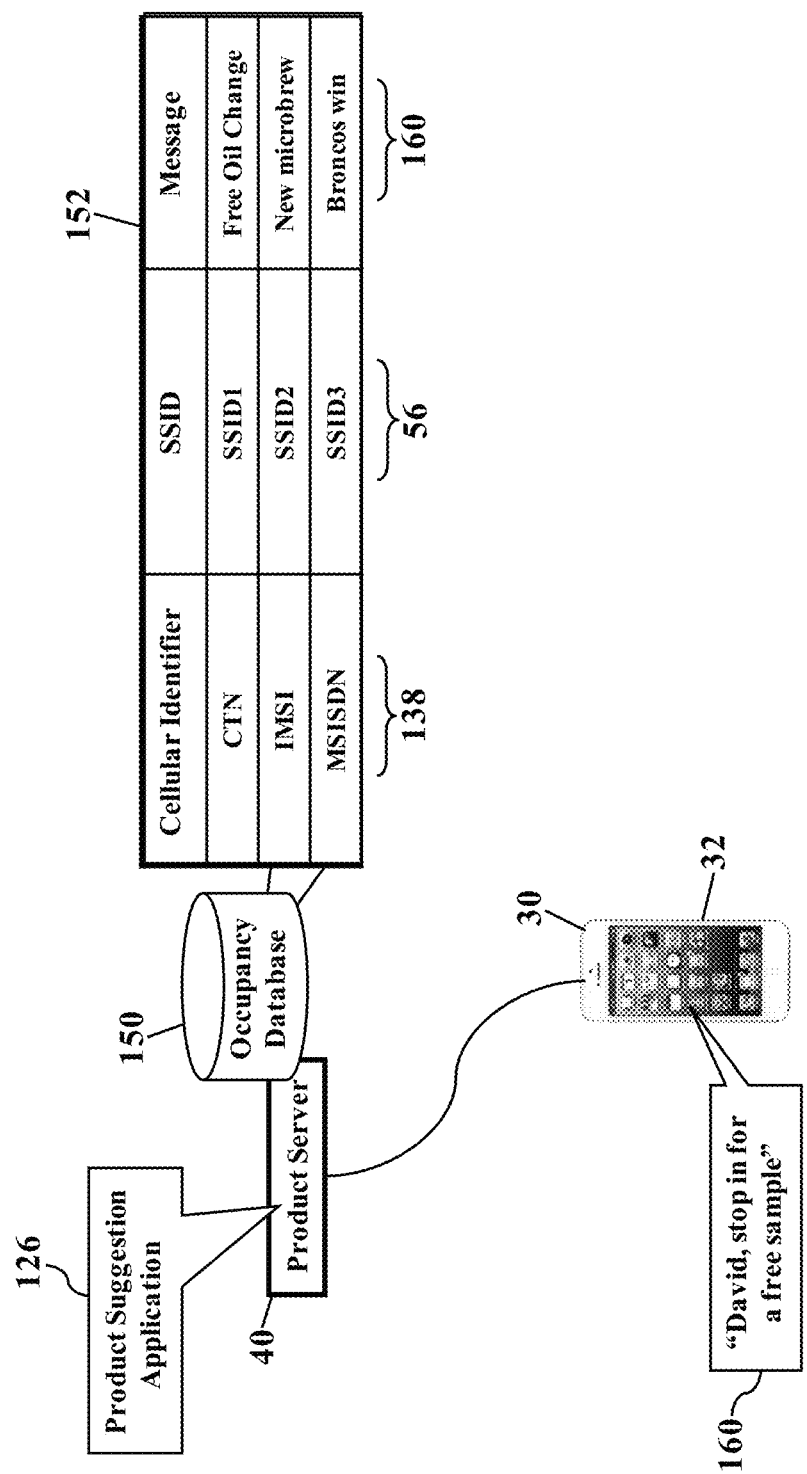
Figure 15:
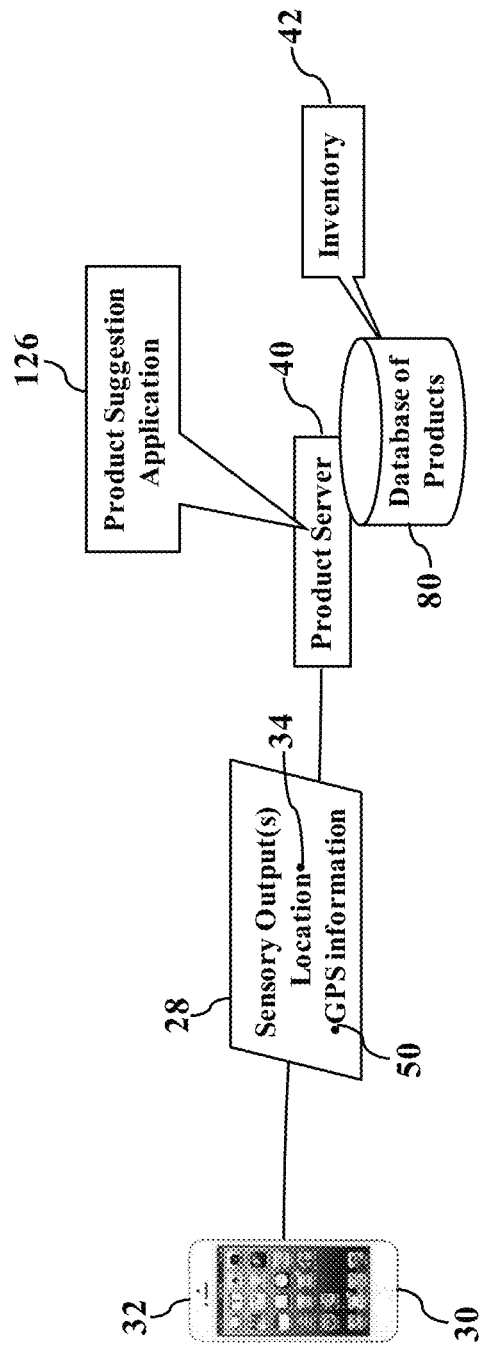
FIGS. 15-18 illustrate commerce suggestions, according to exemplary embodiments.

FIGS. 13-14 illustrate personalized messages, according to exemplary embodiments. As the occupancy database 150 maintains the current location 34 of each occupant, exemplary embodiments may send a personalized message 160 to each occupant. For example, exemplary embodiments may send a personalized greeting or promotion to the user's smartphone 32. As exemplary embodiments may track the movements of the user's smartphone 32 (using wireless tracking and/or network registrations, as earlier explained), the product server 40 may email or text a personal greeting ("Mary, thank you for entering Nordstrom's") to the user's smartphone 32. The personalized message 160 may be based on locational rules, such as predetermined text associated with the user's current location 34. When the product server 40 determine the user's profile 90, the product server 40 may also generate and send a personalized promotion ("Tom, razors are BOGO in aisle 3"). FIG. 14, for example, illustrates entries that electronically associate the cellular identifier 138 to the SSID 56 and to the corresponding personalized message 160. So, once the SSID 56 is determined (as earlier explained), the product server 40 may query the occupancy database 150 and retrieve the corresponding personalized message 160. The personalized message 160, in other words, may be based on the WI-FI® network currently serving the shopper's smartphone 32. Indeed, if the cellular identifier 138 is reported (again as above explained), the personalized message 160 may even include the shopper's name or other personal information, as revealed by subscriber or customer database information. Exemplary embodiments may thus track the user's location 34 and historical transactions to recommend the inventory 42 most likely to appeal. Other occupants, of course, may receive different personalized messages, again based on their current locations 34 and/or historical shopping habits. Messages may also be auto-generated and broadcasted to any or all occupants.

FIGS. 15-18 illustrate commerce suggestions, according to exemplary embodiments. Here exemplary embodiments may recommend products and services based on the sensory outputs 28 generated by the sensors 30. FIG. 15, again for simplicity, illustrates the smartphone 34 sending its location 34 (e.g., the GPS information 50 determined by a GPS transceiver). The smartphone 32 may send the sensory outputs 28 via the Internet to the network address associated with the product server 40. The product server 40 may then determine the inventory 42 in proximity to the location 34. The product server 40, for example, may query the electronic database 80 of products for the location 34 reported by the smartphone 32.

Figure 16:
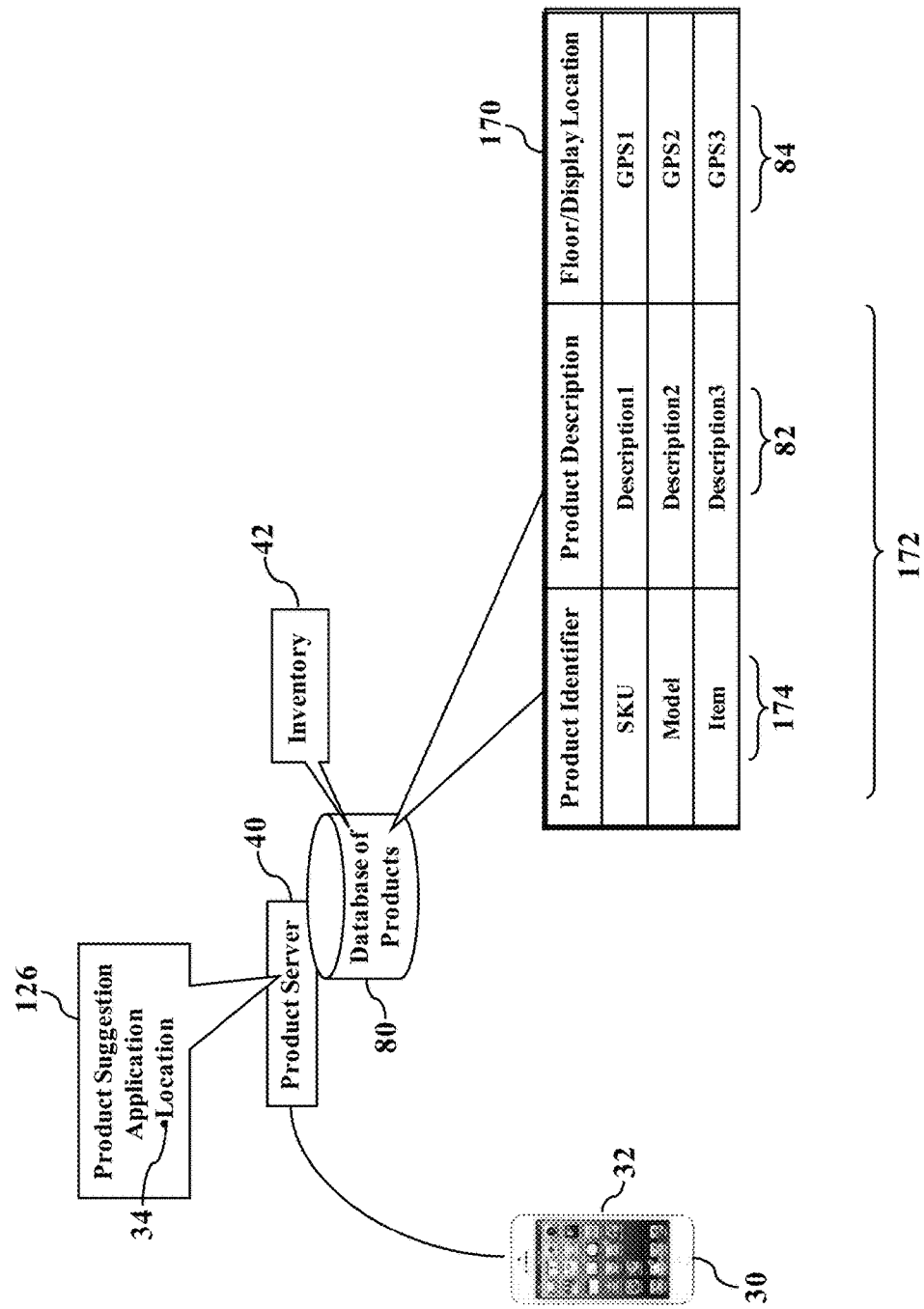

FIG. 16 illustrates the electronic database 80 of products. While the electronic database 80 of products may have any structure, FIG. 16 illustrates the electronic database 80 of products as a table 170 that electronically maps, relates, or associates different products 172 to their corresponding floor or display location 84. Each different product 172 may be uniquely identified by a product identifier 174 (such as a SKU, model number, or item number) and its corresponding product description 82. The electronic database 80 of products may thus be configured to store the physical location (e.g., such as GPS coordinates describing the floor or display location 84) associated with each product 172 in the merchant's inventory 42. When the sensor 30 (such as the smartphone 32) reports its location 34, the product server 40 may thus execute a database lookup and retrieve the product description 82 associated with the product 172 having a generally matching floor or display location 84.

Figure 17:
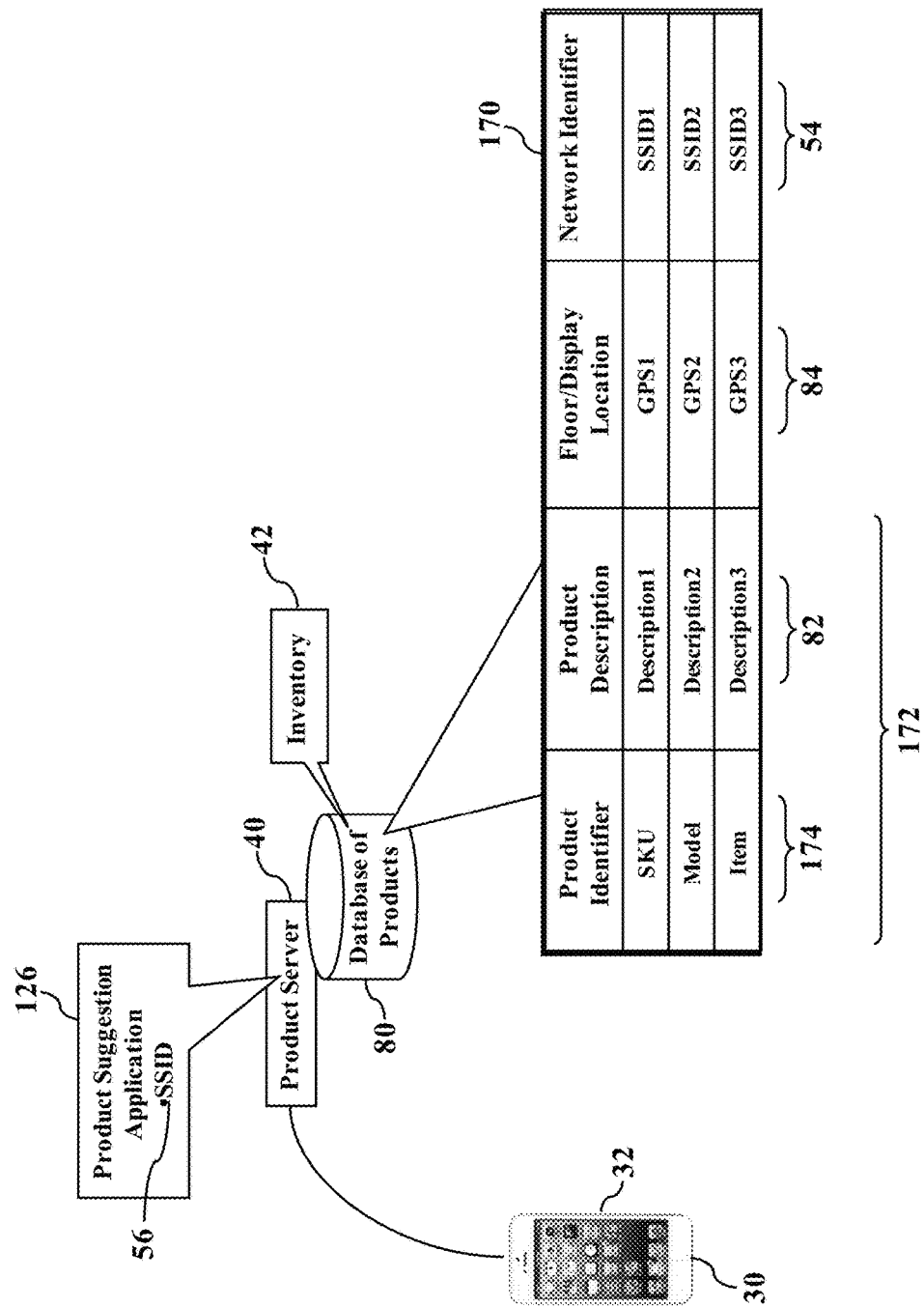

FIG. 17 illustrates network associations. Here exemplary embodiments may relate the different products 172 to their corresponding network identifiers 54. That is, the electronic database 80 of products may have entries that associate the different products 172 to their corresponding floor or display locations 84 and to the corresponding service set identifier (or "SSID") 56. The electronic database 80 of products may thus map the product 172 to the WI-FI® network providing wireless service in its vicinity. When the sensor 30 (such as the smartphone 32) reports its serving SSID 56, the product server 40 may thus retrieve the product(s) 172 associated with that same SSID 56.

Figure 18:
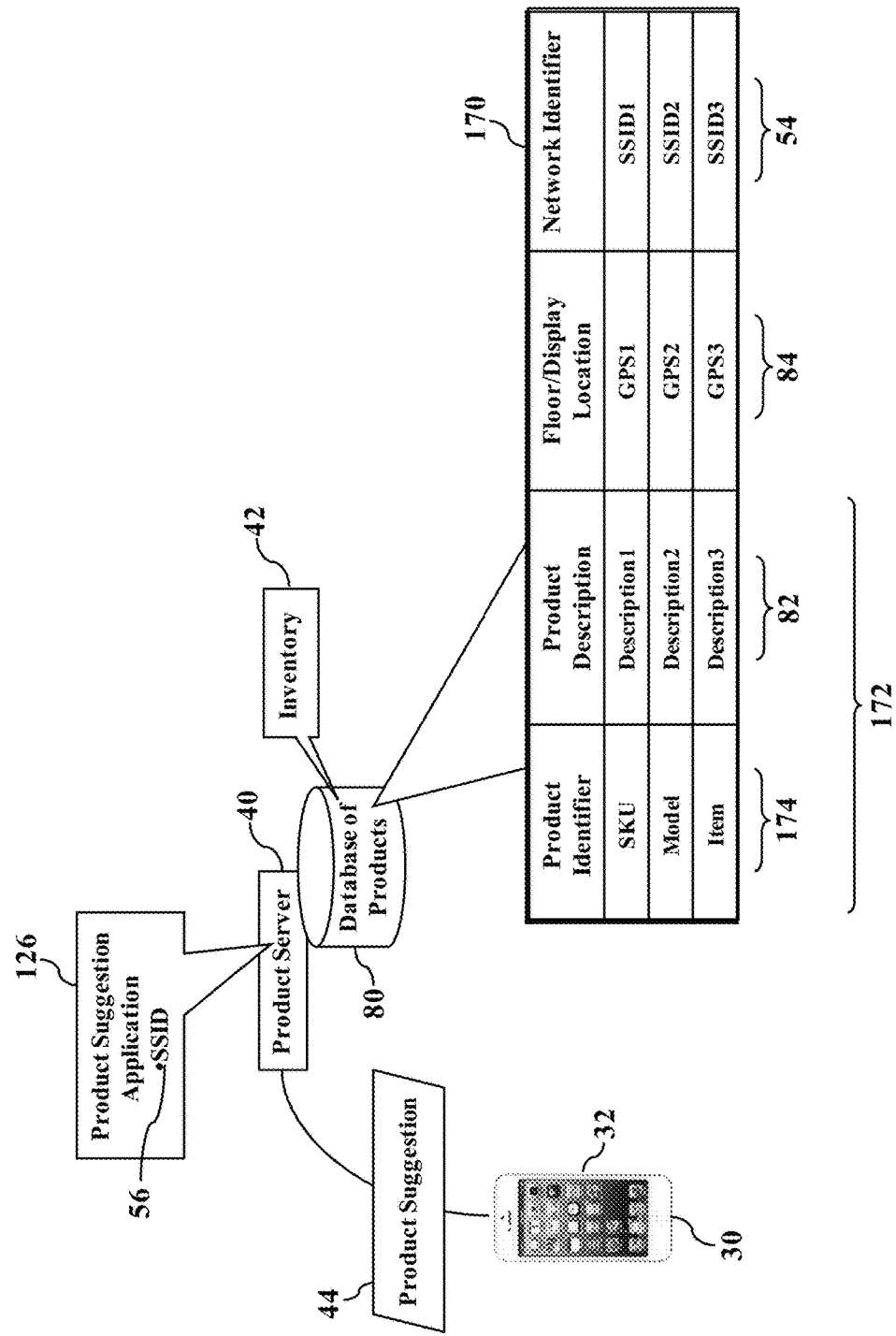

FIG. 18 illustrates the product suggestion 44. Once the product(s) 172 are determined, the product server 40 may notify the user. The product suggestion application 126, for example, may instruct the product server 40 to generate the electronic product suggestion 44 that incorporates the product identifier 174 and/or its corresponding product description 82 (perhaps as data, a website link, and/or text). The product server 40 sends the product suggestion 44 to Internet protocol network address associated with the the sensor 30 (such as an SMS text message to the cellular identifier 138 associated with the smartphone 32). So, as the user's smartphone 32 roams the merchant's store, the product server 40 may query for the products 172 having the same or similar vicinity. Exemplary embodiments, in plain words, promote goods and services according to the location 34 and/or the SSID 56.

Figure 19:
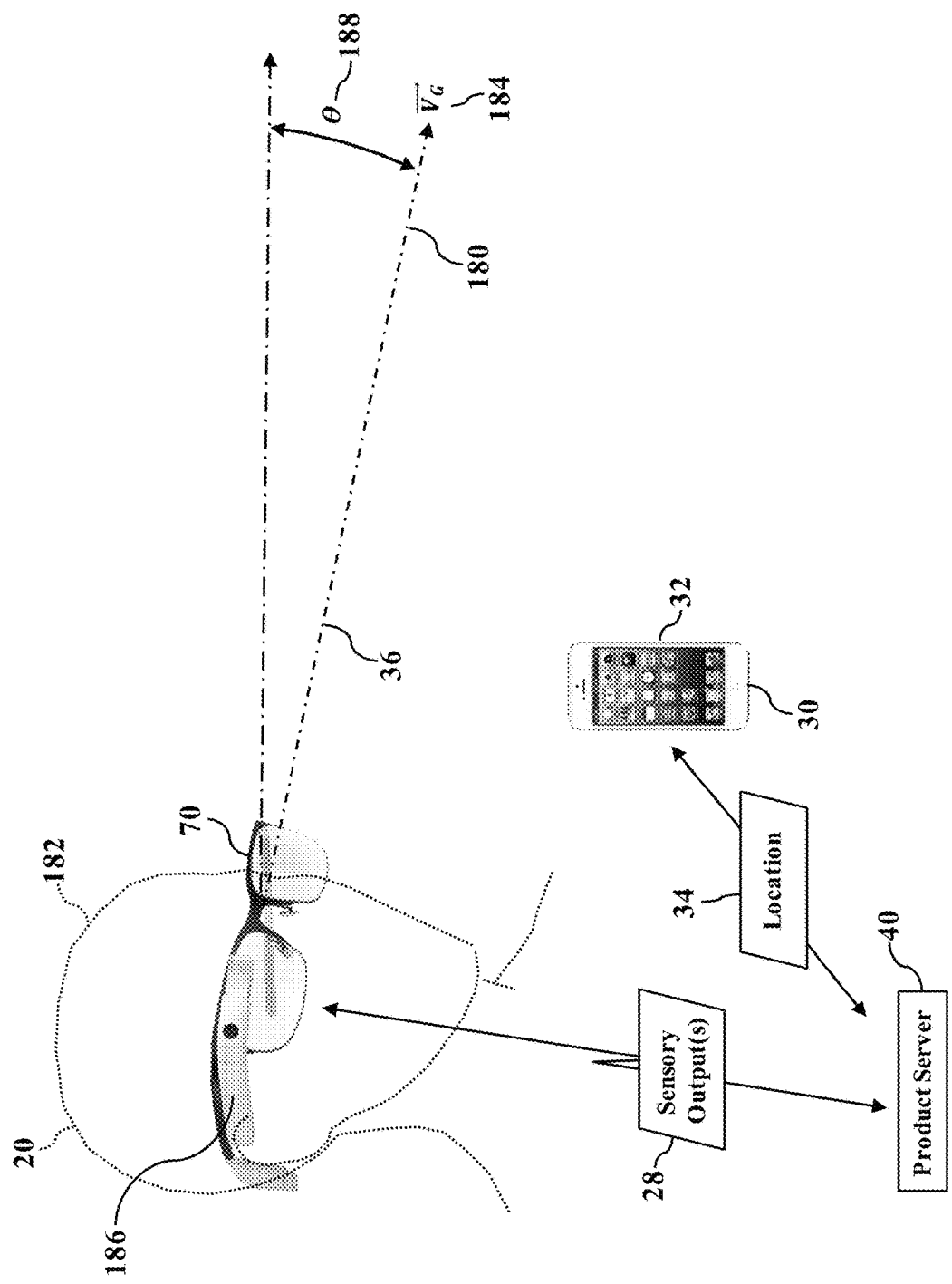
FIGS. 19-21 further illustrate commerce suggestions, according to exemplary embodiments.
Figure 20:
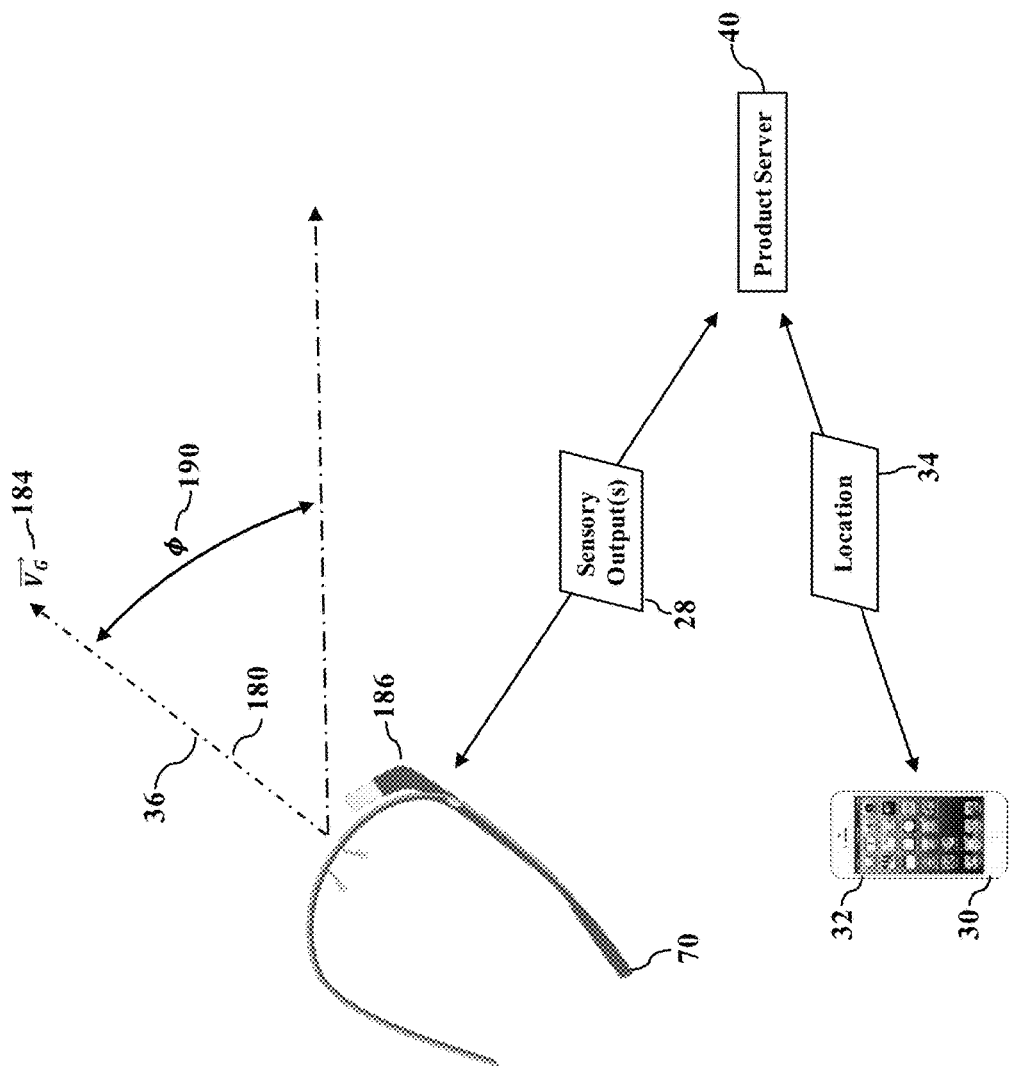
Figure 21:
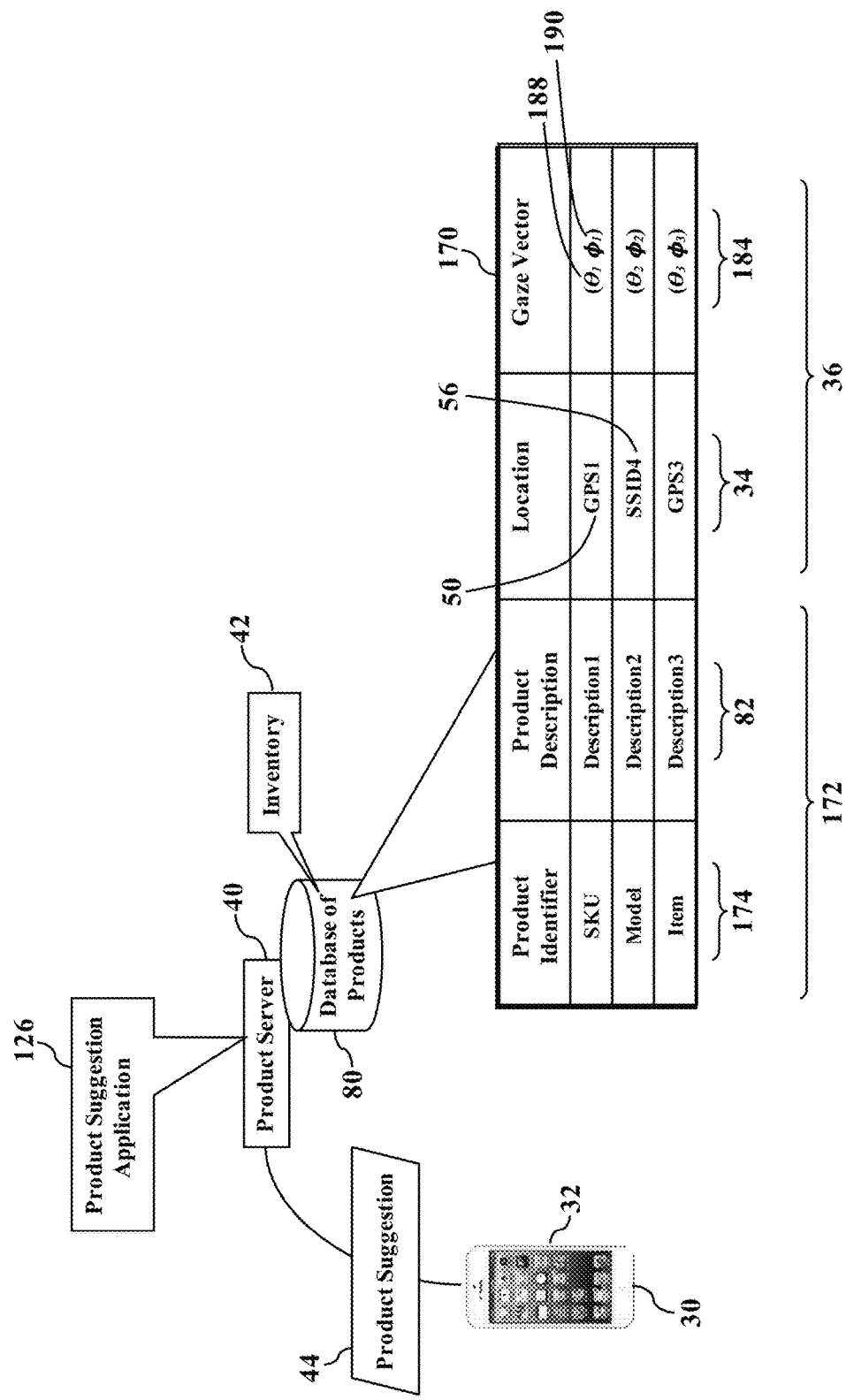

FIGS. 19-21 further illustrate commerce suggestions, according to exemplary embodiments. Here exemplary embodiments may augment recommendations using visual data. As FIG. 19 illustrates, here the product server 40 may determine a vector direction 180 associated with movements of the user's head 182. Suppose, for example, that the user 20 wears the smart glasses 70. As the user 20 moves her head 182, exemplary embodiments may determine a gaze vector $\vec{V}_G$ (illustrated as reference numeral 184) from the smart glasses 70 representing the vector direction 180 of her gaze 36 in three-directions or dimensions. The gaze vector $\vec{V}_G$ 184 has a beginning or origination at the smart glasses 70. While any technology may be used, FIG. 19 illustrates one or more accelerometers 186. The accelerometers 186 generate the sensory outputs 28 for determining an azimuth angle $\theta$ (illustrated as reference numeral 188 in FIG. 19) with respect to zero, origin, or reference position (such as downward gravity). The sensory outputs 28 may be sent (perhaps via the communications network 110 illustrated in FIG. 8 and/or the wireless network 130 illustrated in FIG. 9) to the product server 40. As FIG. 20 illustrates, exemplary embodiments may additionally or alternatively determine a turning angle $\phi$ (illustrated as reference numeral 190) with respect to a zero, origin, or reference position (such as a magnetic compass direction or true north). The smart glasses 70 may thus identify the vector direction 180 by determining the turning angle $\phi$ and the azimuth angle $\theta$. These sensory outputs 28 may be combined with the current location 34 reported by the smartphone 32. For example, assuming an origin (e.g., 0, 0, 0) at the current location 34, the vector direction 180 orients to the turning angle $\phi$ and to the azimuth angle $\theta$ (assuming a spherical coordinate system). The radius R, of course, may be unknown, as exemplary embodiments only determined the localized vector direction 180 in terms of the turning angle $\phi$ and the azimuth angle $\theta$. Exemplary embodiments thus yield three-directions of the vector direction 180 representing the user's gaze 36.

FIG. 21 illustrates the electronic database 80 of products. Here the electronic database 80 of products may electronically associate the user's gaze 36 to a product 172 in the merchant's inventory 42. As FIG. 21 illustrates, the electronic database 80 of products may have entries for different locations 34 (such as the GPS information 50 and/or the service set identifiers (or "SSID") 56 and different gaze vectors $\vec{V}_G$ 184. Each different gaze vector $\vec{V}_G$ 184 is illustrated as its coordinate pairing of the azimuth angle $\theta$ (illustrated as reference numeral 188) and the turning angle $\phi$ (illustrated as reference numeral 190). The product server 40 may thus query for the location 34, the SSID 56, and/or the gaze vector $\vec{V}_G$ 184 and retrieve the corresponding product identifier(s) 174 and/or product description 82 that have been predetermined and pre-aligned with the user's gaze 36. The product server 40 may then generate and send the electronic product suggestion 44 that incorporates the product 172 in the vicinity of the user's location 34 and aligned with the user's gaze 36.

Figure 22:
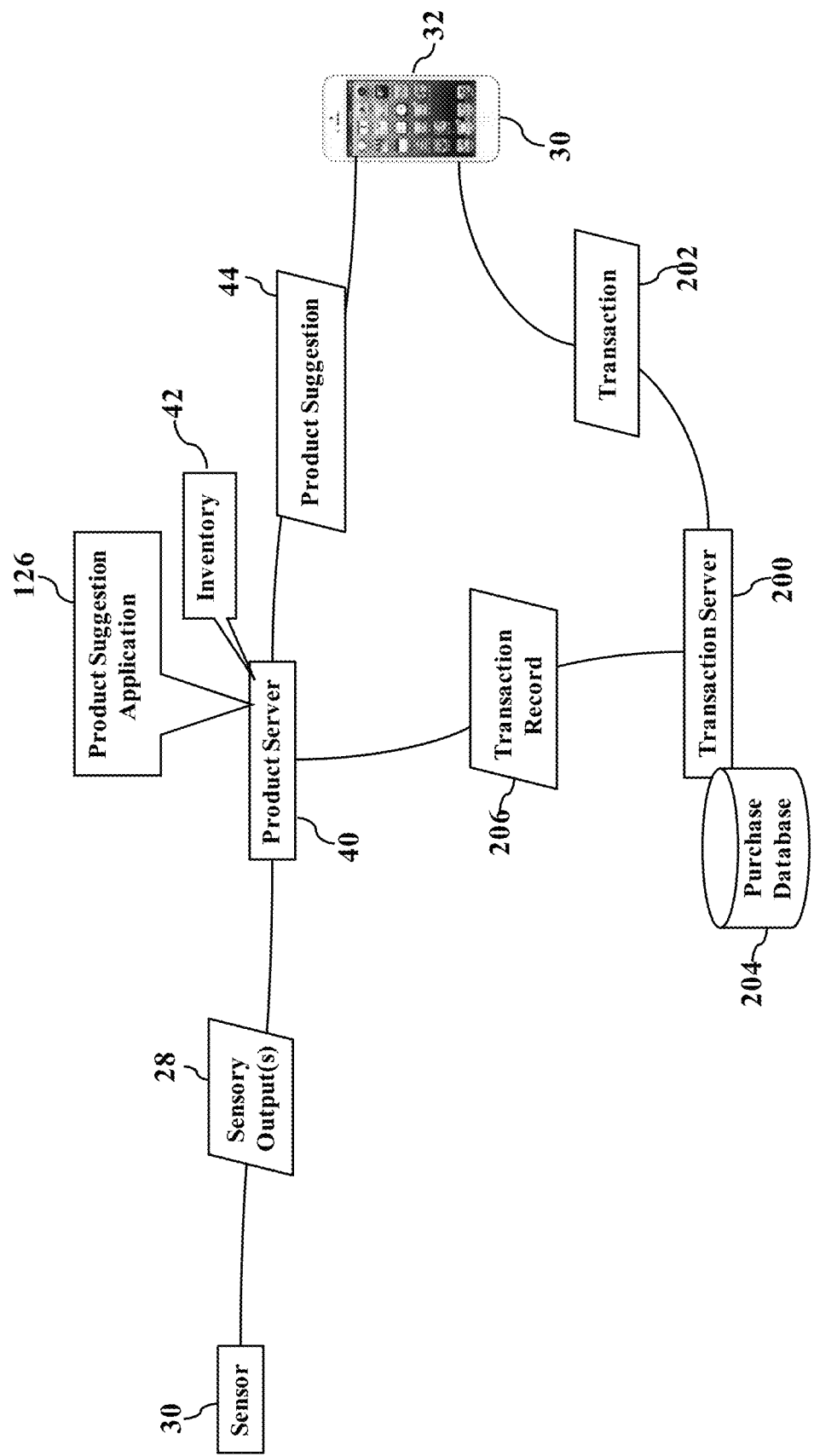
FIG. 22 illustrates electronic transactions, according to exemplary embodiments.

FIG. 22 illustrates electronic transactions, according to exemplary embodiments. Here exemplary embodiments may be informed of product purchases. As the reader may understand, at some point customers will purchase the product or service described by the product suggestion 44. Some customer, of course, will decline to purchase the product or service described by the product suggestion 44. FIG. 22 thus illustrates an interface between the product server 40 and a transaction server 200. The transaction server 200 processes a financial transaction 202 (whether cash or electronic via credit card). FIG. 22, for simplicity, illustrates the financial transaction 202 conducted with the user's smartphone 32. Whenever the transaction server 200 conducts or processes the financial transaction 202, the financial transaction 202 may be logged as an entry in a purchase database 204. The product server 40 may thus query the purchase database 204 and retrieve a transaction record 206 associated with the financial transaction 202. The product suggestion application 126 may thus cause the product server 40 to compare the transaction record 206 to a historical log of the product suggestions 44. Exemplary embodiments may thus measure or evaluate a performance or outcome when recommending the merchant's inventory 42.

Figure 23:
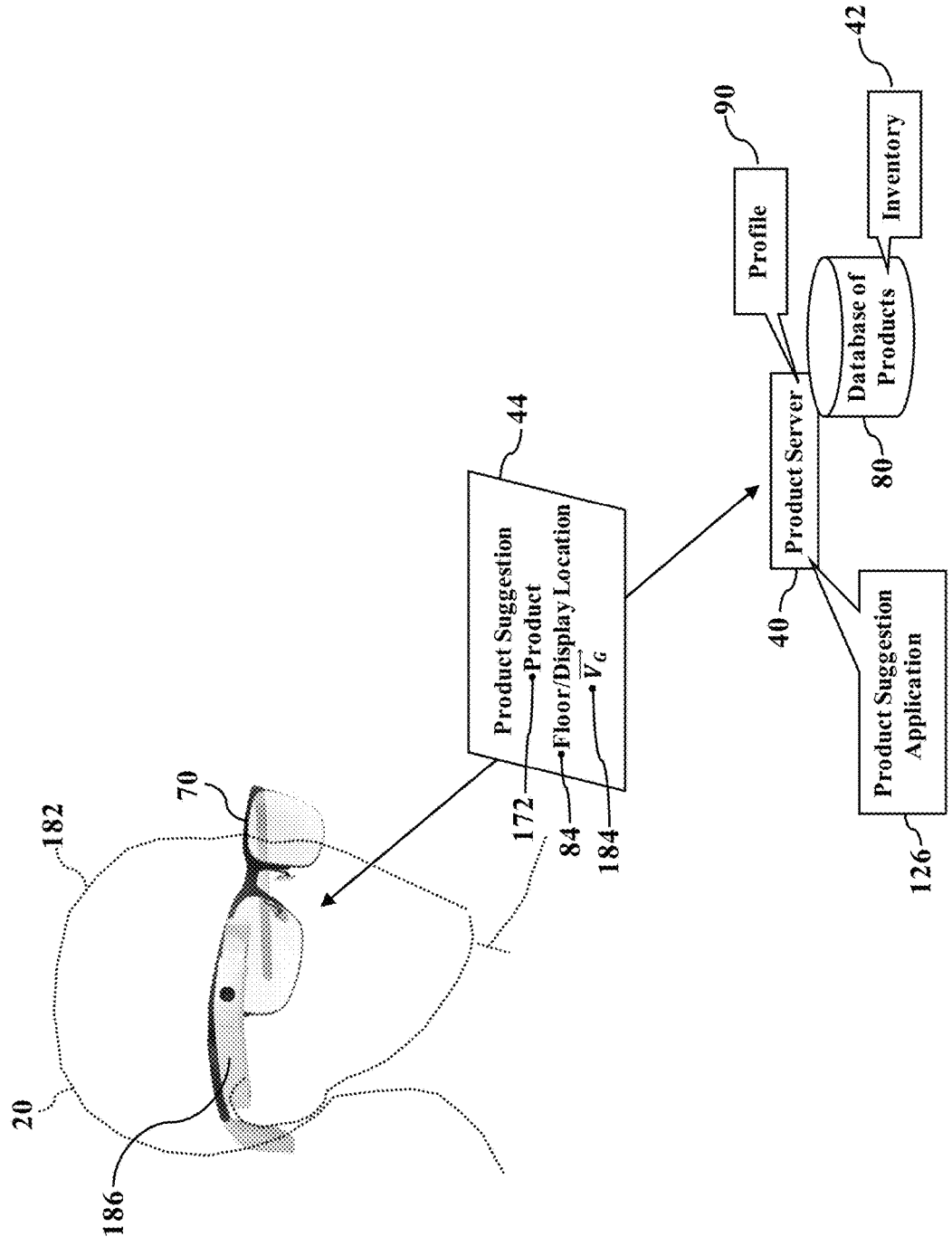
FIGS. 23-25 illustrate visual navigational aids, according to exemplary embodiments.
Figure 24:
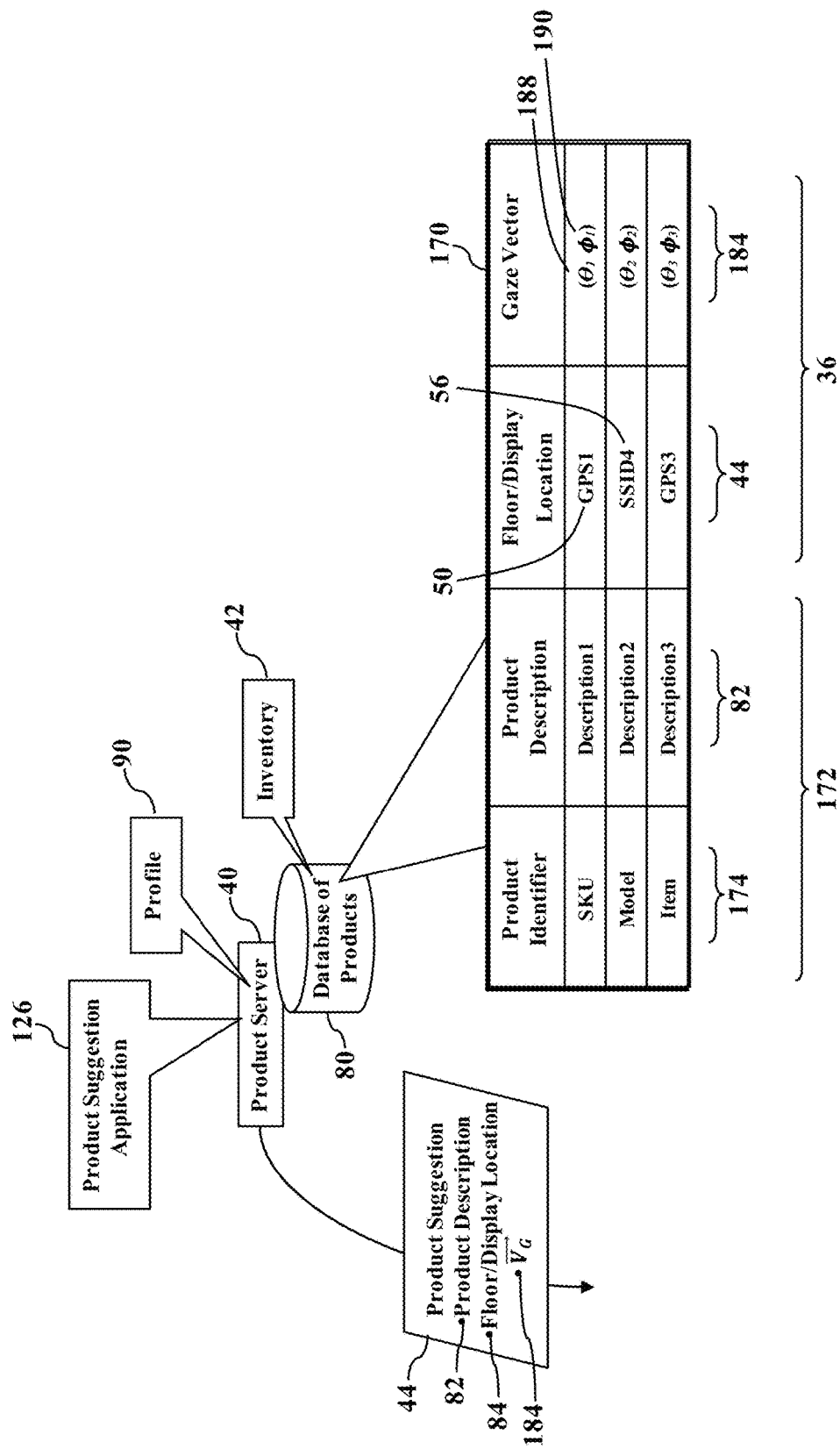
Figure 25:
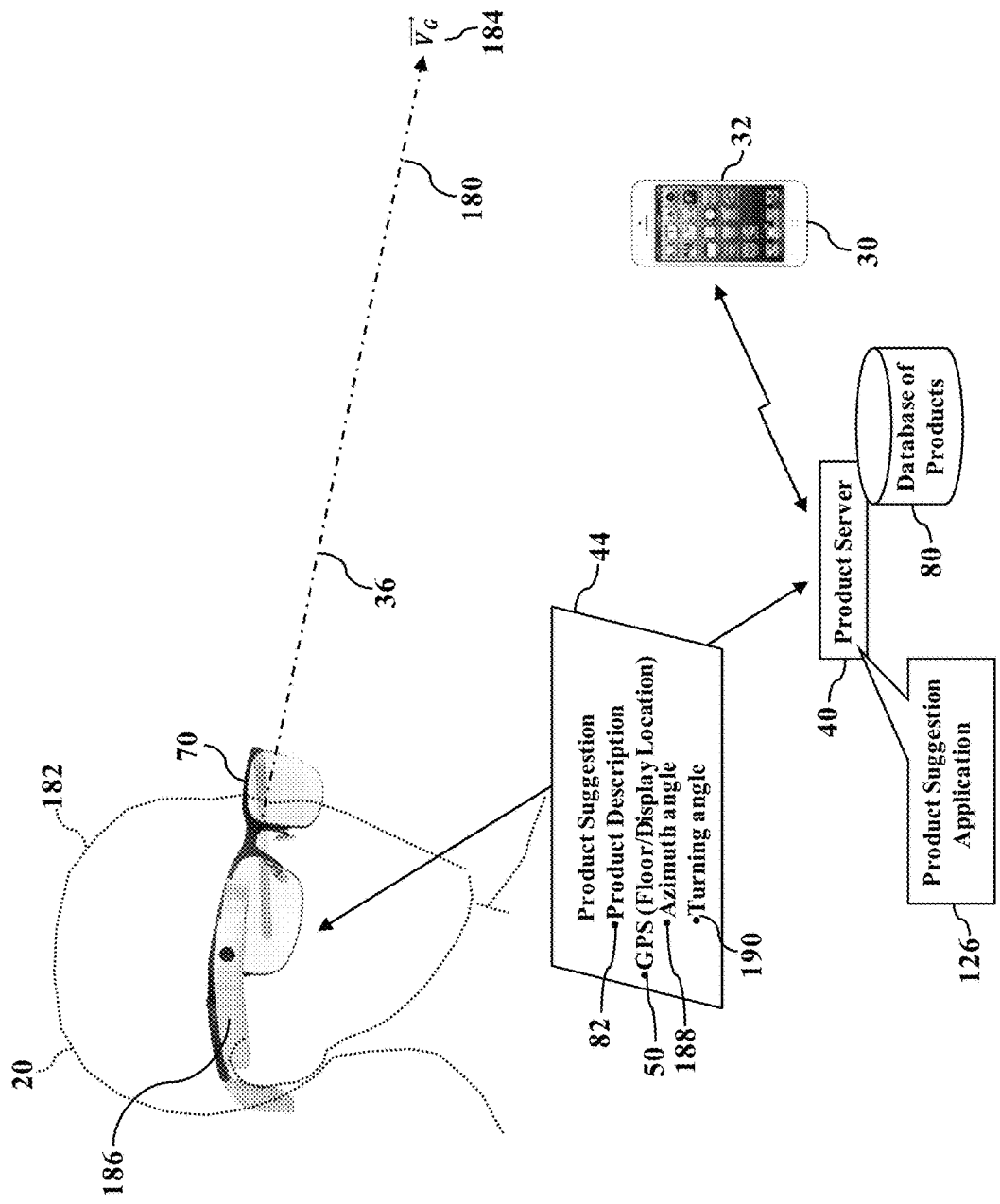

FIGS. 23-25 illustrate visual navigational aids, according to exemplary embodiments. Here exemplary embodiments may visually lead or guide the user to a physical location associated with the product suggestion 44. That is, when exemplary embodiments determine the product suggestion 44, exemplary embodiments may also lead the user to the product 172 associated with the recommended product 172. As FIG. 23 illustrates, suppose the product suggestion application 126 determines the user's profile 90 and targets the product 172 in the merchant's inventory 42 that best appeals to the user's profile 90 (as this disclosure above explained). When the product server 40 sends the product suggestion 44, the product suggestion 44 may also include information or data describing the corresponding floor/display location 84 and the gaze vector $\vec{V}_G$ 184. FIG. 23 illustrates the product suggestion 44 routing to the network address associated with the smart glasses 70, but the product suggestion 44 may additionally or alternatively route to the smartphone 32 (as above explained). Regardless, the floor/display location 84 and the gaze vector $\vec{V}_G$ 184 may thus be used as navigational inputs for guiding the user to the physical location associated with the recommended product 172.

FIG. 24 illustrates an elegant reverse lookup. The product suggestion application 126 determines the user's profile 90 and compares to the different products 172 in the merchant's inventory 42. The product suggestion application 126 thus determines the product identifier 174 and the product description 82 that best appeals to the user's profile 90 (as this disclosure above explained). Here, then, the product suggestion application 126 may cause the product server 40 to query the database 80 of products for the product identifier 174 and/or the product description 82 and retrieve the corresponding floor/display location 84 and the gaze vector $\vec{V}_G$ 184. For example, the product server 40 may retrieve the GPS information 50 and/or the service set identifier (or "SSID") 56 associated with the targeted product 172. Moreover, the product server 40 may also retrieve the corresponding azimuth angle θ (illustrated as reference numeral 188) and the turning angle φ (illustrated as reference numeral 190). The product server 40 may thus send the product suggestion 44 with the GPS information 50, SSID 56, azimuth angle θ 188, and the turning angle φ 190 as packet header or payload.

FIG. 25 further illustrates the navigational aids. The product suggestion 44 routes to its destination network address. For example, assume the product suggestion 44 routes to either or both of the user's smartphone 32 and the user's smart glasses 70. Either device 32 or 70 may thus guide the user 20 to the recommended product 172 according to the GPS information 50 and/or SSID 56 representing its floor/display location 84. Moreover, the smartphone 32 and/or the user's smart glasses 70 may cooperate to orient the user's head 182 to the azimuth angle θ 188 and to the turning angle φ 190. For example, the smart glasses 70 may display or project digital readouts of user's current gaze 36 with directional arrows to the desired azimuth angle θ 188 and to the turning angle φ 190 associated with the recommended product 172. Exemplary embodiments may thus physically guide the user 20 and her gaze 36 to the recommended product 172.

Figure 26:
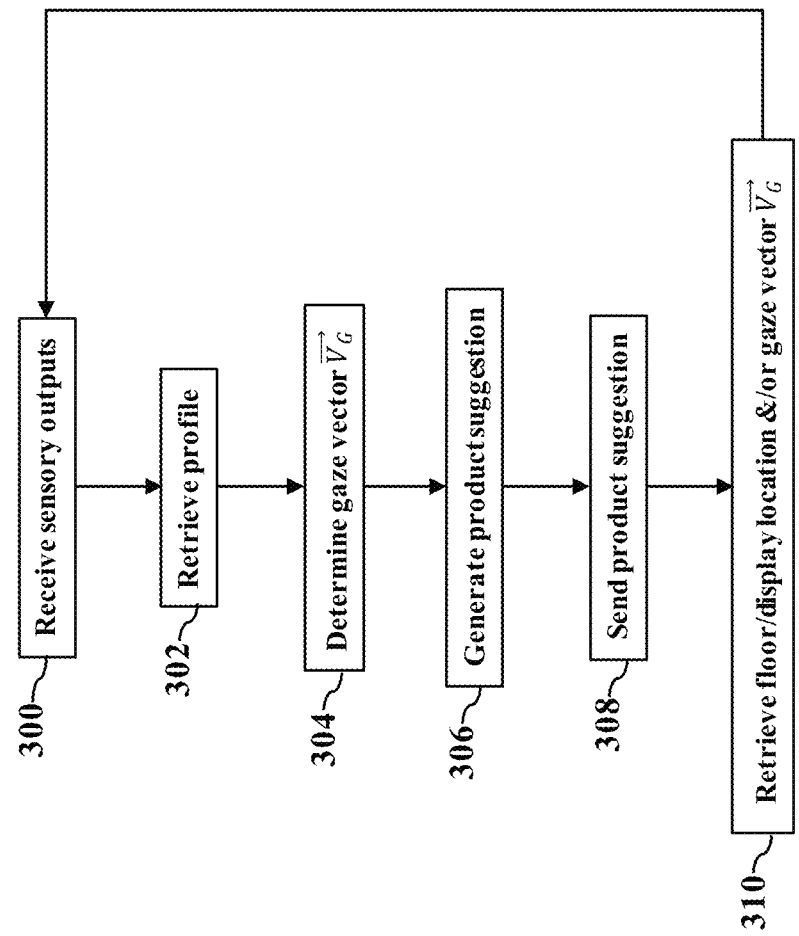
FIG. 26 is a flowchart illustrating an algorithm for commerce recommendations, according to exemplary embodiments.

FIG. 26 is a flowchart illustrating an algorithm for commerce recommendations, according to exemplary embodiments. The sensory outputs 28 may be received (Block 300). The profile 90 may be retrieved (Block 302). The gaze vector $\vec{V}_G$ 184 may be determined (Block 304). The product suggestion 44 is generated (Block 306) and sent to a destination network address (Block 308). The product suggestion 44 may additionally include the floor/display location 84 and the gaze vector $\vec{V}_G$ 184 to the recommended product 172 (Block 310).

Figure 27:
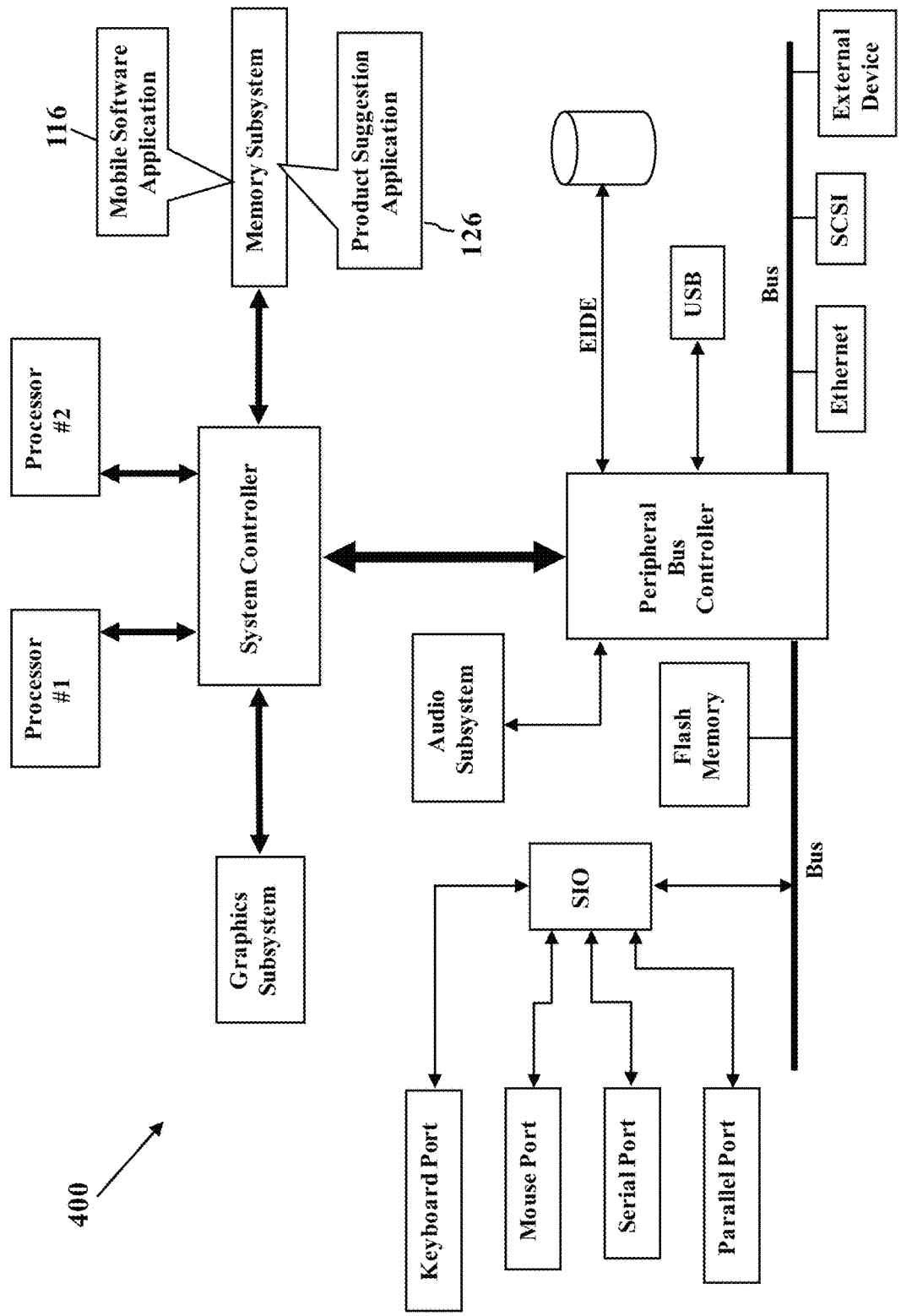

FIG. 27 illustrates still more exemplary embodiments. FIG. 27 is a more detailed diagram illustrating a processor-controlled device 400. As earlier paragraphs explained, exemplary embodiments may partially or entirely operate in any mobile or stationary processor-controlled device. FIG. 27, then, illustrates the mobile software application 116 and/or the product suggestion application 126 stored in a memory subsystem of the processor-controlled device 400. One or more processors communicate with the memory subsystem and execute either, some, or all applications. Because the processor-controlled device 400 is well known to those of ordinary skill in the art, no further explanation is needed.

Figure 28:
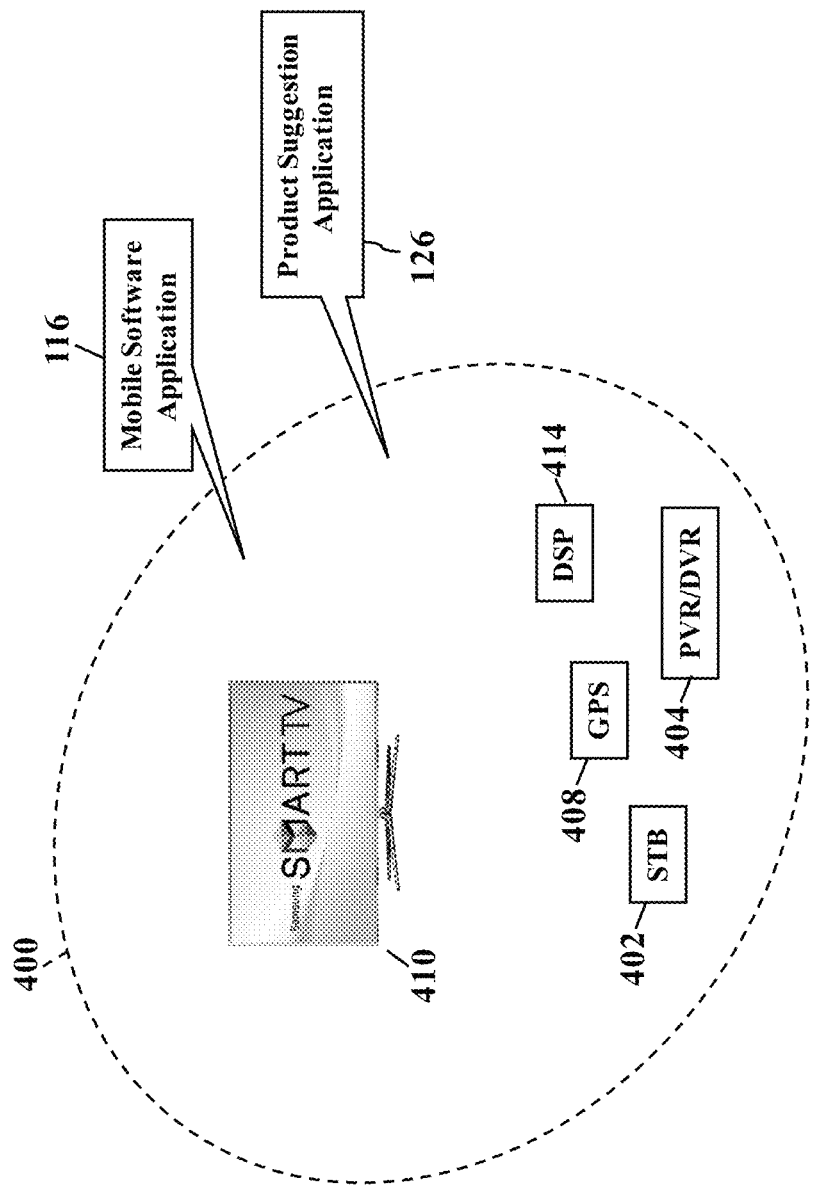

FIG. 28 depicts other possible operating environments for additional aspects of the exemplary embodiments. FIG. 28 illustrates the mobile software application 116 and/or the product suggestion application 126 operating within various other processor-controlled devices 400. FIG. 28, for example, illustrates a set-top box ("STB") (402), a personal/digital video recorder (PVR/DVR) 404, a Global Positioning System (GPS) device 408, an interactive smart television 410, and any other computer system, communications device, or processor-controlled device utilizing the processor and/or a digital signal processor (DP/DSP) 414. The device 400 may also include watches, radios, vehicle electronics, clocks, printers, gateways, mobile/implantable medical devices, and other apparatuses and systems. Because the architecture and operating principles of the various devices 400 are well known, the hardware and software componentry of the various devices 400 are not further shown and described.

Figure 29:
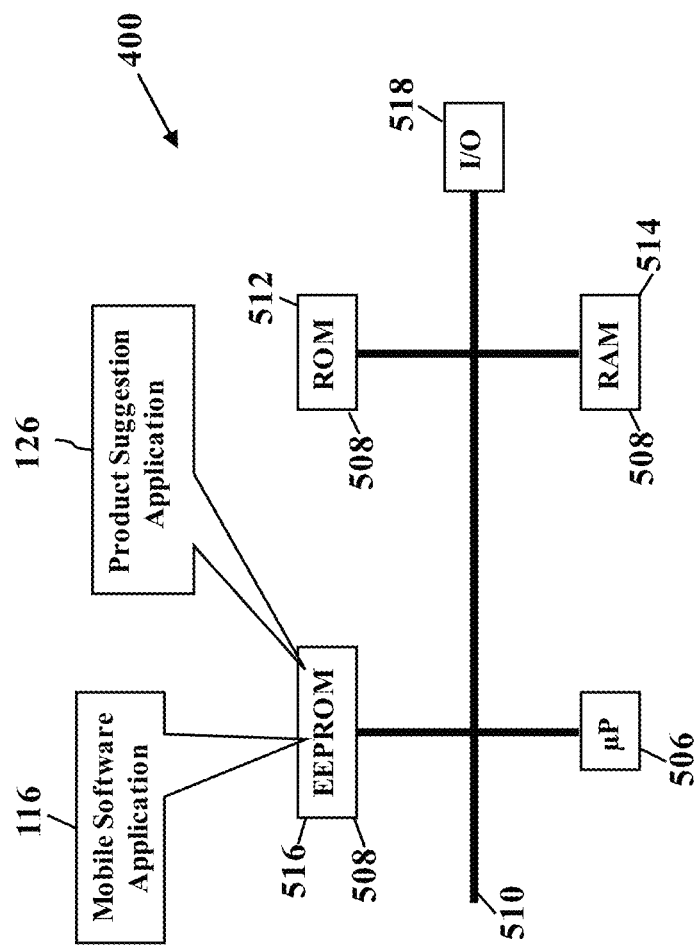

FIGS. 29-31 are schematics further illustrating the processor-controlled device 400, according to exemplary embodiments. FIG. 29 is a block diagram of a Subscriber Identity Module 500, while FIGS. 30 and 31 illustrate, respectively, the Subscriber Identity Module 500 embodied in a plug 502 and in a card 504. As those of ordinary skill in the art recognize, the Subscriber Identity Module 500 may be used in conjunction with many devices (such as the smartphone 32). The Subscriber Identity Module 500 stores user information (such as the cellular identifier 138, a user's International Mobile Subscriber Identity, the user's $K_i$ number, and other user information) and any portion of the mobile software application 116 and/or the product suggestion application 126. As those of ordinary skill in the art also recognize, the plug 502 and the card 504 each may interface with any mobile or stationary device.

FIG. 29 is a block diagram of the Subscriber Identity Module 500, whether embodied as the plug 502 of FIG. 30 or as the card 504 of FIG. 31. Here the Subscriber Identity Module 500 comprises a microprocessor 506 (μP) communicating with memory modules 508 via a data bus 510. The memory modules 508 may include Read Only Memory (ROM) 512, Random Access Memory (RAM) and or flash memory 514, and Electrically Erasable-Programmable Read Only Memory (EEPROM) 516. The Subscriber Identity Module 500 stores some or all of the mobile software application 116 and/or the product suggestion application 126 in one or more of the memory modules 508. FIG. 29 shows the mobile software application 116 and/or the product suggestion application 126 residing in the Erasable-Programmable Read Only Memory 516, yet either application may alternatively or additionally reside in the Read Only Memory 512 and/or the Random Access/Flash Memory 514. An Input/Output module 518 handles communication between the Subscriber Identity Module 500 and the processor-controlled device 400. Because Subscriber Identity Modules are well known in the art, this patent will not further discuss the operation and the physical/memory structure of the Subscriber Identity Module 500.

Figure 32:
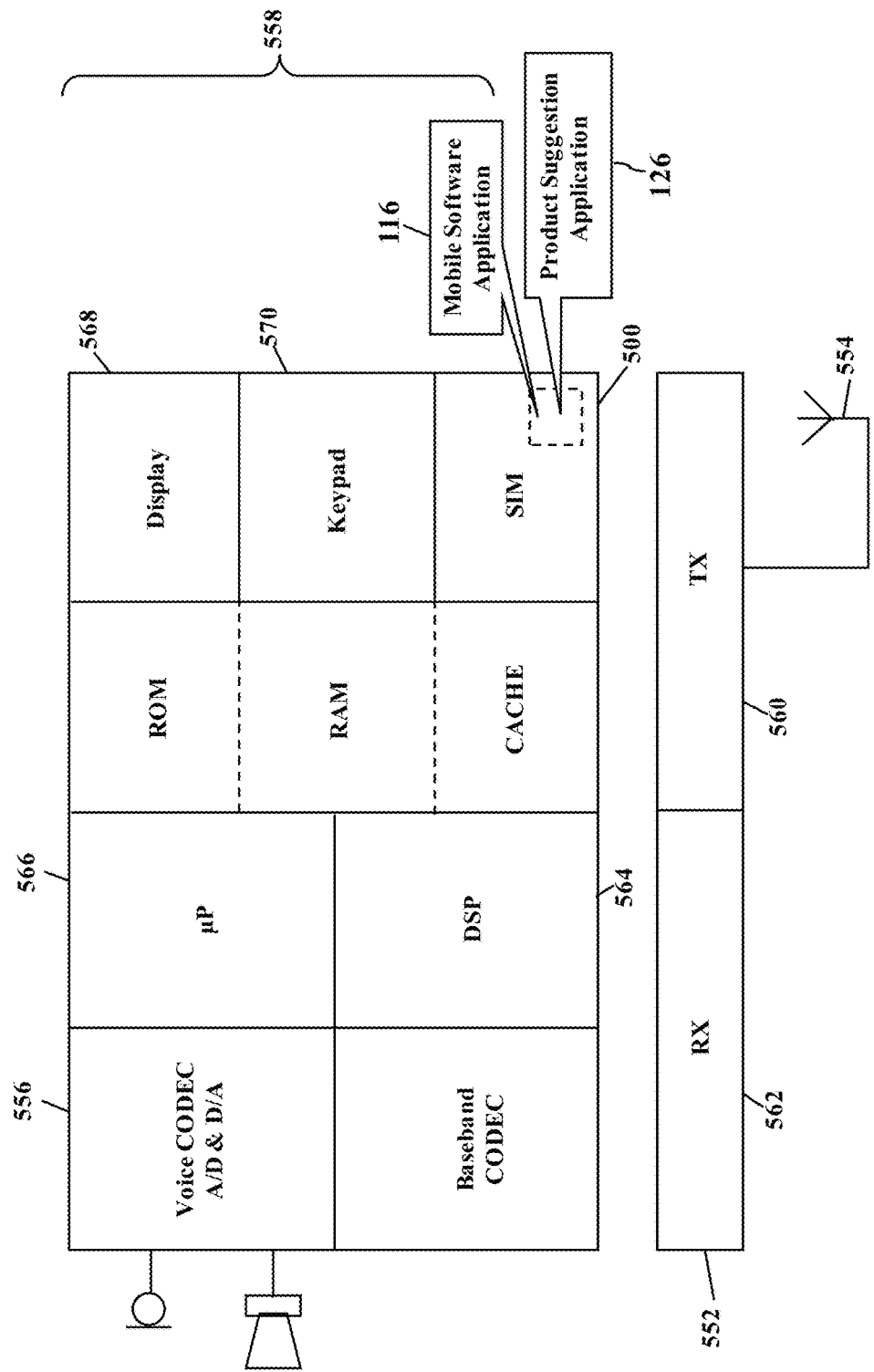

FIG. 32 is a schematic further illustrating the operating environment, according to exemplary embodiments. FIG. 32 is a block diagram illustrating more componentry of the processor-controlled device 400. The componentry may include one or more radio transceiver units 552, an antenna 554, a digital baseband chipset 556, and a man/machine interface (MMI) 558. The transceiver unit 552 includes transmitter circuitry 560 and receiver circuitry 562 for receiving and transmitting radio-frequency (RF) signals. The transceiver unit 552 couples to the antenna 554 for converting electrical current to and from electromagnetic waves. The digital baseband chipset 556 contains a digital signal processor (DSP) 564 and performs signal processing functions for audio (voice) signals and RF signals. As FIG. 32 shows, the digital baseband chipset 556 may also include an on-board microprocessor 566 that interacts with the man/machine interface (MMI) 558. The man/machine interface (MMI) 558 may comprise a display device 568, a keypad 570, and the Subscriber Identity Module 500. The on-board microprocessor 566 may also interface with the Subscriber Identity Module 500 and with the mobile software application 116 and/or the product suggestion application 126.

Exemplary embodiments may be applied to any signaling standard. As those of ordinary skill in the art recognize, FIGS. 29-32 may illustrate a Global System for Mobile (GSM) communications device. That is, exemplary embodiments may utilize the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable memory device or other storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for recommending commerce, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system for providing an electronic suggestion to purchase a product based on a location associated with a mobile device, the system comprising:
 a hardware processor; and
 a memory device, the memory device storing instructions, the instructions when executed causing the hardware processor to perform operations, the operations comprising:
 receiving an access notification sent from a wireless router broadcasting a service set identifier associated with a wireless local area network;
 in response to the receiving of the access notification, determining a radio frequency presence of the mobile device in the location wirelessly served by the wireless router broadcasting the service set identifier associated with the wireless local area network;
 receiving an azimuth angle θ and a turning angle φ associated with the mobile device in the location wirelessly served by the wireless router broadcasting the service set identifier associated with the wireless local area network;
 querying an electronic database for the service set identifier, the azimuth angle θ, and the turning angle φ, the electronic database electronically associating product identifiers to service set identifiers and to coordinate pairings of azimuth angles and turning angles including the service set identifier, the azimuth angle θ, and the turning angle φ;
 identifying a stock keeping unit as one of the product identifiers electronically associated by the electronic database to the service set identifier, to the azimuth angle θ, and to the turning angle φ;
 generating a message specifying a description associated with the stock keeping unit; and
 sending the message via the wireless local area network to the mobile device located in the location wirelessly served by the wireless router, the message providing the electronic suggestion to purchase a product associated with the stock keeping unit.

2. The system of claim 1, wherein the operations further comprise determining a visual gaze that corresponds to the azimuth angle θ and to the turning angle φ.

3. The system of claim 1, wherein the operations further comprise determining a cellular identifier associated with the mobile device.

4. The system of claim 1, wherein the operations further comprise retrieving the stock keeping unit from the electronic database.

5. The system of claim 1, wherein the operations further comprise logging the service set identifier as the location reported by the mobile device.

6. The system of claim 1, wherein the operations further comprise logging the service set identifier in an occupancy database associated with a merchant.

7. The system of claim 1, wherein the operations further comprise logging the service set identifier and a time.

8. A method of providing an electronic suggestion to purchase a product based on a location associated with a mobile device, comprising:
- receiving, by a server, an access notification sent from a wireless router broadcasting a service set identifier associated with a wireless local area network;
- in response to the receiving of the access notification, determining, by the server, a radio frequency presence of the mobile device in the location wirelessly served by the wireless router broadcasting the service set identifier associated with the wireless local area network;
- receiving, by the server, an azimuth angle θ and a turning angle φ associated with the mobile device in the location wirelessly served by the wireless router broadcasting the service set identifier associated with the wireless local area network;
- querying, by the server, an electronic database for the service set identifier, the azimuth angle θ, and the turning angle φ, the electronic database electronically associating product identifiers to service set identifiers and to coordinate pairings of azimuth angles and turning angles including the service set identifier, the azimuth angle θ, and the turning angle φ;
- identifying, by the server, a product identifier of the product identifiers that is electronically associated by the electronic database to the service set identifier, to the azimuth angle θ, and to the turning angle φ;
- generating, by the server, a message specifying the product identifier; and
- sending, by the server, the message to the mobile device via the wireless router broadcasting the service set identifier associated with the wireless local area network, the providing the electronic suggestion to purchase a product associated with the product identifier.

9. The method of claim 8, further comprising determining a cellular identifier associated with the mobile device.

10. The method of claim 8, further comprising determining an inventory associated with the service set identifier.

11. The method of claim 10, further comprising retrieving the inventory.

12. The method of claim 8, further comprising logging the service set identifier in an occupancy database associated with a merchant.

13. The method of claim 8, further comprising logging the service set identifier as the location.

14. The method of claim 8, further comprising logging the service set identifier and a time.

15. A memory device storing instructions that when executed cause a processor to perform operations, the operations comprising:
- receiving an access notification sent from a wireless router broadcasting a service set identifier associated with a wireless local area network;
- in response to the receiving of the access notification, determining a radio frequency presence of a mobile device in a location wirelessly served by the wireless router broadcasting the service set identifier associated with the wireless local area network;
- receiving an azimuth angle θ and a turning angle φ associated with the mobile device in the location wirelessly served by the wireless router broadcasting the service set identifier associated with the wireless local area network;
- querying an electronic database for the service set identifier, the azimuth angle θ, and the turning angle φ, the electronic database electronically associating product identifiers and service set identifiers and coordinate pairings of azimuth angles and turning angles including the service set identifier, the azimuth angle θ, and the turning angle φ;
- identifying a product identifier of the product identifiers that is electronically associated by the electronic database to the service set identifier, to the azimuth angle θ, and to the turning angle φ;
- generating a message specifying the product identifier that is electronically associated with the service set identifier, the azimuth angle θ, and the turning angle φ; and
- sending the message to the mobile device via the wireless router broadcasting the service set identifier associated with the wireless local area network, the message providing an electronic suggestion to purchase a product associated with the product identifier.

16. The memory device of claim 15, wherein the operations further comprise determining a network address associated with the mobile device.

17. The memory device of claim 16, wherein the operations further comprise determining an inventory associated with the service set identifier.

18. The memory device of claim 17, wherein the operations further comprise retrieving the inventory.

19. The memory device of claim 15, wherein the operations further comprise logging the service set identifier in an occupancy database.

20. The memory device of claim 15, wherein the operations further comprise logging a time and the service set identifier.

* * * * *